(12) United States Patent  
Zagoudis

(10) Patent No.: US 10,853,741 B2  
(45) Date of Patent: Dec. 1, 2020

(54) INFORMATION GOVERNANCE PLATFORM

(71) Applicant: MetaGovernance Inc., Atlanta, GA (US)

(72) Inventor: Steven Alan Zagoudis, Atlanta, GA (US)

(73) Assignee: MetaGovernance, Inc., Atlanta, GA (US)

(*) Notice: Subject to any disclaimer, the term of this patent is extended or adjusted under 35 U.S.C. 154(b) by 231 days.

(21) Appl. No.: 14/570,236

(22) Filed: Dec. 15, 2014

(65) Prior Publication Data

US 2015/0169595 A1 Jun. 18, 2015

Related U.S. Application Data

(60) Provisional application No. 61/916,535, filed on Dec. 16, 2013.

(51) Int. Cl.
*G06Q 10/00* (2012.01)

(52) U.S. Cl.
CPC .................................. *G06Q 10/00* (2013.01)

(58) Field of Classification Search
CPC ... G06Q 10/00; G06F 17/30371; G06F 21/50; G06F 21/51; G06F 16/2365
USPC .................................................. 707/687, 694
See application file for complete search history.

(56) References Cited

U.S. PATENT DOCUMENTS

| | | | |
|---|---|---|---|
| 8,170,902 B2 | 5/2012 | Kennis et al. | |
| 8,694,347 B2 | 4/2014 | Kennis et al. | |
| 8,706,684 B2 | 4/2014 | Chilakamarri et al. | |
| 9,047,580 B1* | 6/2015 | Marlowe | G06Q 40/12 |
| 2004/0249656 A1 | 12/2004 | Schwerin-wenzel et al. | |
| 2005/0075916 A1* | 4/2005 | Lathram | G06Q 10/0637 |
| | | | 705/7.36 |
| 2005/0234969 A1 | 10/2005 | Mamou et al. | |
| 2007/0043674 A1* | 2/2007 | DiFalco | G06F 16/128 |
| | | | 705/51 |
| 2007/0071979 A1* | 3/2007 | Komuro | C22C 33/0278 |
| | | | 428/403 |
| 2008/0270205 A1* | 10/2008 | Kumar | G06Q 10/06 |
| | | | 705/7.13 |
| 2009/0018996 A1 | 1/2009 | Hunt et al. | |
| 2009/0259680 A1* | 10/2009 | Berry | G06F 9/547 |
| 2011/0071979 A1* | 3/2011 | Tahiliani | G06F 16/2365 |
| | | | 707/600 |
| 2012/0102071 A1 | 4/2012 | Trog et al. | |
| 2012/0117023 A1 | 5/2012 | Trog et al. | |
| 2012/0246303 A1 | 9/2012 | Petersen et al. | |

(Continued)

FOREIGN PATENT DOCUMENTS

| | | |
|---|---|---|
| EP | 2246811 | 11/2010 |
| EP | 2425383 | 3/2012 |
| WO | WO/2010/125061 | 11/2010 |

*Primary Examiner* — Hares Jami

(74) *Attorney, Agent, or Firm* — Schott, P.C.

(57) ABSTRACT

Consistent with embodiments of the present disclosure, an information governance platform may be provided. The platform of the present disclosure may provide computer-implemented, metadata-driven methods and systems for managing enterprise data risk by incorporating information governance reconciliation controls and stakeholder notifications. The information governance platform may be configured to map and verify data consistency across an organization employing a plurality of data sources.

15 Claims, 35 Drawing Sheets

(56) References Cited

U.S. PATENT DOCUMENTS

| | | | |
|---|---|---|---|
| 2013/0138603 A1* | 5/2013 | Chilakamarri | G06Q 10/00 707/609 |
| 2013/0204886 A1 | 8/2013 | Faith et al. | |
| 2013/0231967 A1* | 9/2013 | Jesionowski | G06Q 10/00 705/7.11 |
| 2013/0254162 A1* | 9/2013 | Watt | G06F 17/30294 707/610 |
| 2014/0058908 A1* | 2/2014 | Gupta | G06Q 40/12 705/30 |
| 2014/0108071 A1 | 4/2014 | Boaz et al. | |
| 2014/0250537 A1* | 9/2014 | Siris | H04L 63/10 726/28 |
| 2014/0379665 A1* | 12/2014 | Benjamin | G06Q 40/00 707/687 |

* cited by examiner

Subject Area: TRADE / ADVANCE / MEMBER

GENERAL

Code: 001
Name: TRADE / ADVANCE / MEMBER
Description: Member-level details for an advance
Effective From: Sep 1, 2014
Effective Thru:

MORE INFO

Notes: Subject area provides member-level details for the advance.

- Details
- Categories
- Governance
- Info Sources
- Business Attribution
- Security Classes
- Retention Classes

INFORMATION GOVERNANCE PLATFORM

PRIORITY CLAIM

Under provisions of 35 U.S.C. § 119(e), the Applicant claims the benefit of U.S. provisional application No. 61/916,535, filed Dec. 16, 2013, which is incorporated herein by reference.

It is intended that each of the referenced applications may be applicable to the concepts and embodiments disclosed herein, even if such concepts and embodiments are disclosed in the referenced applications with different limitations and configurations and described using different examples and terminology.

FIELD OF DISCLOSURE

The present disclosure generally relates to organizational information and data governance.

BACKGROUND

Organizations often have insufficient control over their information assets. Such organizations sometimes implement partial vendor solutions that fail to address the problem. Obsolete core business systems, department systems and staff that don't talk to each other, and changes in business plans lead to the proliferation of ad hoc data fixes and disparate data repositories, patched together with spreadsheets. These one-off solutions are often implemented with a lack of appropriate controls. In the face of increasing regulatory scrutiny, companies unaware of the true state of their data face an unacceptable level of operational risk. Their reputation, as well as the value of their brand, is at risk.

Since ad-hoc data fixes, disparate data repositories, and spreadsheet solutions are implemented at an operational level, executive management is sometimes not aware of the extent of the problem until a significant error is detected or an audit uncovers a lack of proper controls. Organizations that are aware of the problem may hire validators armed with more spreadsheets to manually collect and verify data or they look to consultants to recommend solutions. Spreadsheets can exacerbate the problem and consulting recommendations are often costly and not always optimal. In the face of increasing regulatory scrutiny, companies unaware of the true state of their data face an unacceptable level of operational risk. Their reputation, as well as the value of their brand, may be at risk.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

Consistent with embodiments of the present disclosure, an information governance platform may be provided. The platform of the present disclosure may provide computer-implemented, metadata-driven methods and systems for managing enterprise data risk by incorporating information governance reconciliation controls and stakeholder notifications. The information governance platform may be configured to map and verify data consistency across an organization employing a plurality of data sources.

Consistent with embodiments of the present disclosure, the platform may be configured to perform the following stages. First, the platform maybe configured by a platform administrator or delegate with a plurality of inputs. Configuration may enable the platform to receive a plurality of information sources employed by an organization. The information sources may comprise, but not be limited to, for example, infrastructure for storing, accessing, and distributing data. In some embodiments, the platform may be further configured to classify data associated with the information sources, wherein classifying the data associated with the information sources may comprise, for example, categorizing the data, and assigning a subject matter for the data.

Still consistent with embodiments of the present disclosure, the platform may receive a specification of stakeholders associated with the classified data. Stakeholders may be specified as, for example, but not limited to, a data owner, data steward, data consumer, and data custodian. The platform may further consider each stakeholder's permissions associated with the classified data.

Having been configured with the plurality of inputs, the platform may then proceed to generate a map representing, at least in part, each stakeholder's association with the classified data and a flow of data within the organization. As part of the configuration process, the platform may be configured (by, for example, a platform administrator or delegate) with a plurality of control objects. The control objects may be specified with at least one of the following: data infrastructure configured to serve as test points for accessing the consistency of the flow of information across the map, a stakeholder associated with the data infrastructure, and at least one of the following: tolerances associated with data variances in the data infrastructure key control measures, system of record, known copies and/or provisioning points, reconciliation tolerance requirements, Having the control points established, the platform may perform a control run. Performing the control run may comprise, but not be limited to, accessing the data infrastructure associated each of the plurality of control objects, assessing data associated within the infrastructure, and determining if variances in the data exist.

Based on the control, the platform may then generate a plurality of reports, as well as issue a plurality of notifications. For example, notifications may be issued to the stakeholder associated with each control object in which data variances were detected. Notifications may comprise, for example, a size or number of variances identified during the reconciliation control runs, an amount of history to be retained, and a user security authorization and permissions to manage the incident.

Embodiments of the present disclosure may provide a plurality of dashboards for receiving configuration inputs and displaying at least one reported generated from the control run. Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 10 illustrates an embodiment of an interface for embedding business rules as metadata;

FIG. 31 illustrates an embodiment of a user interface that display results of completed control runs;

DETAILED DESCRIPTION

Figure 1:
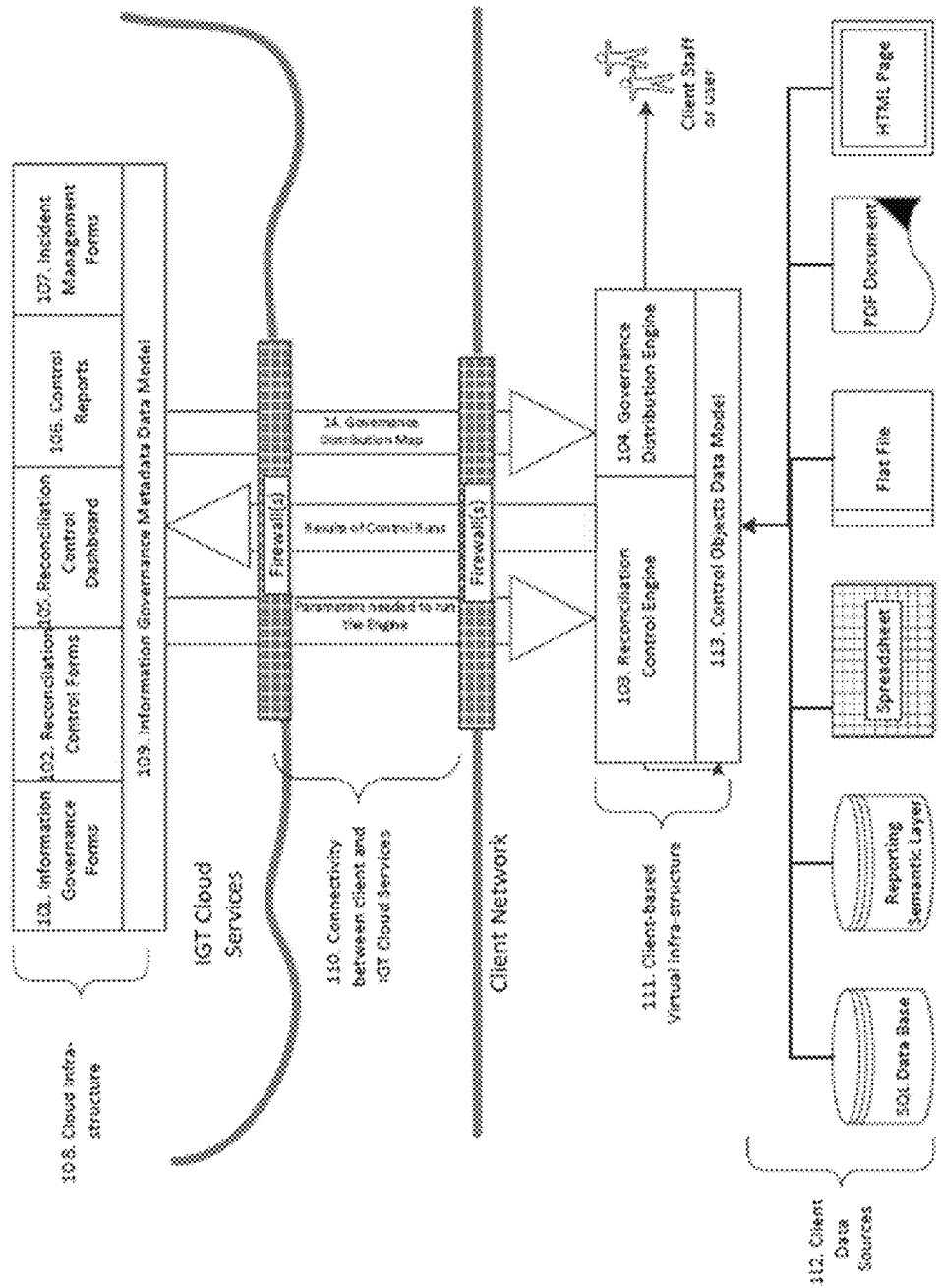
FIG. 1 illustrates a block diagram of an operating environment consistent with the present disclosure.

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

I. PLATFORM OVERVIEW

This overview is provided to introduce a selection of concepts in a simplified form that are further described below. This overview is not intended to identify key features or essential features of the claimed subject matter. Nor is this overview intended to be used to limit the claimed subject matter's scope.

Consistent with embodiments of the present disclosure, an information governance platform may be provided. The platform of the present disclosure may provide computer-implemented, metadata-driven methods and systems for managing enterprise data risk by incorporating information governance reconciliation controls and stakeholder notifications. The information governance platform may be configured to map and verify data consistency across an organization employing a plurality of data sources. The platform may provide an overall control framework to allow multiple stakeholders in an organization to not only manage and track the usage of their own data, but to also share, exchange, reconcile, and manipulate data from other stakeholders who manage the same data.

For example, one stakeholder may interpret a certain data point differently from how another stakeholder interprets the same data point. As such, one stakeholder may input a data entry differently than another stake holder. Although this data is derived from the same information source, the resulting data employed in the practice of one stakeholder may differ than the resulting data employed by the other stakeholder. To address this problem, the platform of the present disclosure provides a computer-implemented and automated framework for enabling stakeholders to identify such discrepancy and reconcile the differences. The platform may build a map (based on metadata derived from a plurality of inputs received from a platform administrator) and test various control variables (e.g., control object test points for accessing the data flow within the map) to ascertain when certain data subject areas fall out of reconciliation and automatically notify key stakeholders to take corrective action.

Consistent with embodiments of the present disclosure, the platform may enable users to create an overall organizational information map. Specifically, a platform administrator or delegate may input a plurality of information which may, in turn, be employed by the platform to generate the organizational map. For example, the platform administrator may create categories of data used by an organization. The specified data categories may be combined to create subject areas. An information source associated with the data may then be identified and, in turn, grouped within the categories and/or subject areas.

Data users (e.g., stakeholders) who have access to the information source may then be defined in the platform. These users may further be grouped together. The platform may account for the users' varying amount of access to the data. For example, as will be detailed below, various business attributes and rules may be defined for specifying how the data is accessed by the users. Such information is collectively gathered and embedded as metadata employed in the platform's creation of the organizational information map.

Having established an organizational information map, embodiments of the present disclosure may employ control runs to verify the consistency of the data used across the organization. Control runs may be scheduled or triggered to check data points for variances. These data points may be points within the organizational information map that the platform has identified to serve as, for example, control points (e.g., control objects as key performance indicators as to the integrity and consistency of the data used across the organization).

The platform may employ control runs to assess various data points within the organizational map (e.g., control objects). The platform may then be configured to report whether or not the data points are identical, within a designated tolerance our outside the designated tolerance. The report may be provided to, for example, stakeholders (e.g., specified platform users) associated with the data. In addition, the platform may provide various reports via different platform dashboards. The dashboards may provide, but not be limited to, among other features, color-coded evidence of the status of reconciling objects across the client infrastructure, automated listings of specific data or information issues identified during reconciliation control runs, and historic trending and awareness of issues identified during reconciliation control runs.

Still consistent with embodiments of the present disclosure, the platform may provide a distribution map of information governance stakeholders may be provided by the platform. In this way, an organizational awareness as to the source and use of data and information across the client organization may be provided (via incorporation on information governance discipline). Moreover, as will be detailed below, the platform may provide information governance awareness of the system of record and known copies and/or provisioning points for control objects across the client organization via incorporation on information governance discipline.

Both the foregoing overview and the following detailed description provide examples and are explanatory only. Accordingly, the foregoing overview and the following detailed description should not be considered to be restrictive. Further, features or variations may be provided in addition to those set forth herein. For example, embodiments may be directed to various feature combinations and subcombinations described in the detailed description.

II. PLATFORM CONFIGURATION a. Operating Environment

FIG. 1 illustrates one possible operating environment through which a platform consistent with embodiments of the present disclosure may be provided. By way of non-limiting example, a Cloud Infrastructure 108 may be hosted on a centralized server. The centralized server is specified in greater detail below with reference to FIG. 35. The Cloud Infrastructure 108 may be comprised of, for example, Information Governance Forms 101, Reconciliation Control Forms 102, Reconciliation Control Dashboard 105, Control Reports 106, Incident Management Forms 107 and an Information Governance Metadata Model 109.

A client staff or user may access the Cloud Infrastructure 108 through a Client-Based Virtual Infrastructure 111. The Client-Based Virtual Infrastructure may be comprised of a software application. The software application may be embodied as, for example, but not limited to, a website, a web application, a desktop application, and a mobile application compatible with a computing device 3500 as detailed in FIG. 35 below. One possible embodiment of the software application may be provided by the InfoGov™ suite of products and services provided by MetaGovernance™ Inc. The software application may be comprised of, but not limited to, a reconciliation control engine 103, a governance distribution engine 104 and a control objects data model 113.

The Client-Based Virtual Infrastructure 111 may interface with Client Data Sources 112. Such Data Sources 112 may be comprised of, for example, SQL databases, reporting semantic layers, spreadsheets, flat files, PDF files and HTML pages.

A Connectivity between client and IGT Cloud Services 110 may enable data transfer between the IGT cloud services and the client network. The Connectivity 110 may be able to transfer data through firewalls. The Connectivity 110 may be comprised of a Governance Distribution Map 114, parameters needed to run the engine, and results of control runs. The Information Governance Metadata Data Model 109 may interface with the Governance Distribution Engine 104 of the Client-Based Virtual Infrastructure 111 through firewalls by way of a Governance Distribution Map 114. The Information Governance Metadata Model 109 may further interface with the Reconciliation Control Engine 103 of the Client-Based Virtual Infrastructure 111 in exchanging parameters needed to run the engine and results of control runs.

A Cloud Infrastructure 108 may be an architectural element comprised of scalable, virtual, network-based services. Such network-based services may be capable of running software and services. In addition, such network-based services may provide communication between software and services. Further, it may retrieve and save data related to managing users in the platform.

An Information Governance Metadata Data Model 109 may be an architectural element comprised of a SQL database structures containing data captured by the platform. The Information Governance Metadata Model 109 may store information about users in the platform. Information components in the platform may be comprised of information such as, for example, name, email address, telephone number and user ID. Information components may further comprise a role name and role description.

Connectivity between the client and IGT Cloud Services 110 may be an architectural element providing connectivity between the client network and IGT Cloud Services.

A Client-based Virtual infrastructure 111 may be an architectural element that enables software to run in a client's virtual network environment.

A Client Data Sources 112 may be data in the client's environment that can be read and extracted by the Reconciliation Control Engine 103.

A Control Objects Data Model 113 may be an architectural element comprised of, but not limited to, for example, an Information Governance Metadata Data Model and database structures (e.g. SQL) containing data captured by the platform.

Governance Distribution Map 114 may be information governance content about what organizational units are stakeholders for a particular reconciliation control run used to target the distribution of the results of the reconciliation control run.

Platform components may be stand-alone or combined. Components may be comprised of a user experience layer (UX) (e.g. web application, native tablet or desktop application), or a graphical user interface (GUI) layer (e.g. thick client application) as well as business logic, web and/or cloud services and data access layers. In addition, on-line transaction processing (OLTP) and on-line analysis processing (OLAP) may be implemented to process and store information. User experience or GUIs may be written in, for example, .NET, Java, C++ or other programming or scripting language and further interface with the web using, for example HTML. Business logic may be implemented through using software development platforms, such as, for example, .NET, Java, C++ or other programming or scripting language. Web and cloud services may implement current technologies, such as, for example, Services Oriented Architecture and technologies such as, for example, SOAP, XML, WCF and HTML as well as proprietary communication protocols. Data access layers and databases may utilize current technologies and languages, such as, for example MSSQL, Oracle, MySQL, SSAS, SSRS or similar OLTP and/or OLAP platforms.

As will be detailed with reference to FIG. 35 below, the computing device through which the platform may be accessed may comprise, but not be limited to, for example, a desktop computer, laptop, a tablet, or mobile telecommunications device.

b. Organizational Information Mapping Components

Information Governance Forms 101 may be a series of functions comprised of software code and metadata. Such software and metadata may utilize relational tables. Such relational tables may provide a platform user with a mechanism to capture and maintain the information governance characteristics of an organization.

A users relational table within the Information Governance Information Governance Metadata Data Model 109 may store information about users in the platform. Information components in the table may be comprised of, for example, name, email address, telephone, and user id. Software code running in a Cloud Infrastructure 108 may retrieve and save data related to managing the users in the platform using this relational table.

A roles relational table within the Information Governance Information Governance Metadata Data Model 109 may store information about roles in the platform. Information components in the table may be comprised of a role name and role description. Software code running in a Cloud Infrastructure 108 may retrieve and save data related to managing the roles in the platform using this roles table.

A relational table within the Information Governance Metadata Data Model 109 may store information regarding user and role association. Information components in the table may be comprised of a unique ID for a user and a unique ID for a role. Software code running in a Cloud Infrastructure 108 may retrieve and save data related to managing what users are associated with which roles using this table.

A relational table within the Information Governance Metadata Data Model 109 may store information about permissions (i.e., which role has access to which functions within the platform). Information components in the table may be comprised of a unique ID for a role and a unique ID for a permission, which would reside in a separate platform table within the Information Governance Metadata Data Model 109 containing a Function ID and a permission level. Software code running in a Cloud Infrastructure 108 may retrieve and save data related to managing the permissions in the platform using this table.

A relational table within the Information Governance Metadata Data Model 109 may store information about business defined data sources in the client's systems. Information components in the table may be comprised of data source name, owner role, data source type such as production system, end user application, and data repository. Software code running in Cloud Infrastructure 108 may retrieve and save data related to managing the business defined data sources in the client's systems using this table.

A relational table within the Information Governance Metadata Data Model 109 may store information about multiple levels of subject areas in the client's systems. Information components in the table may be comprised of Subject Area ID, Subject Area Name, Subject Area Description, Subject Area level names, and subject area long description. Software code running in a Cloud Infrastructure 108 may retrieve and save data related to managing subject areas in the client's systems using this table.

Relational tables within the Information Governance Metadata Data Model 109 may store information about the security level of a subject area. One table may store a description of basic security levels for all systems while another table may store information about the specific security level associated with a subject area.

Software code running in a Cloud Infrastructure 108 may retrieve and save data related to a description for each security level for all systems and software code for associating a certain security level with a certain subject area.

Relational tables within the Information Governance Metadata Data Model 109 may store information about the retention rules for a subject area. One table may store a description of basic retention rules and the other table may store information about the specific retention rule associated with a subject area. Software code running in a Cloud Infrastructure 108 may retrieve and save data related to a description for each basic retention rule and software code for associating a certain retention rule with a certain subject area.

Relational tables within the Information Governance Metadata Data Model 109 may store information about the information governance roles for a subject area. One table may store a description of basic information governance roles (such as owner, steward, consumer, and custodian) and another table may store information about the specific governance roles associated with a role for a subject area. Software code running in a Cloud Infrastructure 108 may retrieve and save data related to a description of each basic governance role and software code for associating a certain governance role with a certain role for a certain subject area.

Relational tables within the Information Governance Metadata Data Model 109 may store information about the business entities and the attributes for those business entities. One table may store information about business entities, which would refer back to a specific subject area. Another table may store information about information attributes associated with a business entity. Software code running in a Cloud Infrastructure 108 may retrieve and save data related business entities for a particular subject area and software code that retrieves and saves data about attributes for a specific entity.

Relational tables within the Information Governance Metadata Data Model 109 may store information about the data bases, tables, columns and SQL statements in a client's IT environment. One table may store information about the databases that would include the physical location of the database within the client's IT environment. Another table may store information about the tables associated with a particular database within the client's IT environment including information such as table name and table description. Another table may store information about the columns associated with a particular table within the client's IT environment including information such as column name and column description. Yet another table may store information containing SQL statements that could be executed to extract data associated with a particular database.

Software code running in a Cloud Infrastructure 108 may retrieve and save data related data bases, tables associated with those data bases, columns within those tables, and SQL statements that can be executed within a particular data base. As another option, software code may load data into the data bases, tables, columns and/or SQL statements from an external source.

A relational table within the Information Governance Metadata Data Model may store information about the physical implementation of a business entity attribute, referred to in the platform as a control object. The control object table may contain a name and description of the control object as well as links together a business entity/attribute with the physical location of the data. Software code running in a Cloud Infrastructure 108 may retrieve and save data related to a control object and also makes the linkage between the control object and a business entity/attribute and the physical location of the control object.

A relational table within the Information Governance Metadata Data Model 109 may store information about the reports that contain control objects that need to be extracted in a reconciliation control run. The table may contain a description of the report as well as the physical location of the report within the client's IT environment and the file type for the report. Valid file types may include PDF, XLS, DOC, RTF, Comma delimited, fixed length, XML, and HTML. Software code running in a Cloud Infrastructure 108 may retrieve and save data related to reports needed for a reconciliation control run.

c. Control Run Components

Reconciliation Control Forms 102 may be a series of functions comprised of software code and metadata. Such software and metadata may utilize relational tables. Such relational tables may provide a platform user with a mechanism to capture and maintain control objects related to business entities. Further, such relational tables may enable the user to capture and maintain the physical location of control objects in a client's computer system. In addition, such relational tables may enable the user to capture and maintain parameters used in executing the Reconciliation Control Engine 103 to execute a reconciliation control run.

A Reconciliation Control Engine 103 may be a series of functions comprised of software code and metadata. Such software code and metadata may operate in the form of executable code. Code may be executed based on a schedule, or executed based on a trigger, such as, for example, a change in data or a manual request for a code execution. When executed, the data may be automatically retrieved from the specified client systems based on the physical location of the data. Comparisons may be made on the data to determine if it is within a tolerance level. Such tolerance levels may be set by parameters in the reconciliation control run set-up. The results of the reconciliation control run may be stored for reporting purposes.

A Governance Distribution Engine 104 may be a series of functions comprised of software code and metadata. Such software code and metadata may operate in the form of executable code. Code may be executed at the end of a Reconciliation Control Engine 103 run. The Governance Distribution Engine 104 may communicate the status and/or results of a reconciliation control run to governance stakeholders. Such communication may be delivered automatically.

A Reconciliation Control Dashboard 105 may be a user interface comprising series of functions comprised of software code and metadata in the form of relational tables. Such relational tables may provide a platform user with a view of the results of a reconciliation control run.

Control Reports 106 may be a series of functions comprised of software code and metadata. Such code and metadata functions may utilize relational tables. Such relational tables may provide the user with a view of the details of a reconciliation control run. The view may take the form of, for example, detail reports, discrepancy reports, historical reports, and parameter based queries.

Incident Management Forms 107 may be a series of functions comprised of software code and metadata. Such code and metadata functions may utilize relational tables. The Incident Management Forms 107 may provide the user with a mechanism to associate the results of an out of balance reconciliation control run with an incident and enter information about the status and resolution of the incident.

Relational tables within the Information Governance Metadata Data Model 109 may store information about how a reconciliation control run will be executed by the Reconciliation Control Engine 103. One table may contain general information about the reconciliation control run including how the run will be triggered, format and location of report results if external to the platform. Another table may associate a reconciliation control run with the control objects that will be included in the reconciliation control run. This table may contain the currency display choice, decimal precision for calculations, tolerance amount and tolerance percent for an out of balance condition, and limits on the number of detailed rows to be retrieved if an out of balance condition occurs in either percent of total rows or fixed number of rows. Another table may contain the additional control objects that will be retrieved so that comparisons can be made on each row of data for the various control objects to identify specific rows that are out of balance.

Software code running in a Cloud Infrastructure 108 may retrieve and save data related to a reconciliation control run, control objects in the reconciliation control run, and additional control objects that can be used to determine which rows are out of balance in a reconciliation control run.

Relational tables within the Information Governance Metadata Data Model 109 may store information about the results of a reconciliation control run. One table may store information such as the run date and status of the run (e.g. in balance, within tolerance, or out of balance, and most recent update date. Another table may store the aggregated values of the control objects of the reconciliation control run. Another table may store the values of individual rows extracted if there is an out of balance condition in the reconciliation control run.

Software code running in a Client-based Virtual Infrastructure 111 may execute a reconciliation control run. This component may have logic so that it can be triggered based on calendar information stored in the reconciliation control run tables or triggered by an external scheduler. Additional information provided by the Information Governance Metadata Model 109 may include information about a reconciliation control run, information about the control objects in the reconciliation control run, information about the corresponding physical location of the control objects, information about the storage of the report results, information about the control objects in the reconciliation control run, information about the additional control objects needed to identify discrepancies and information about the physical location of the control objects in the client environment all related to a subject area.

Such information may be passed via the Connectivity between client and IGT Cloud Services 110 from the Cloud Infrastructure 108 to the Client-based Virtual Infrastructure 111. This information may be used to "compile" extracts from the Client Data Sources 112 and the aggregated results are passed to the Control Objects Data Model 113. Balances may be compared based on the thresholds set in the reconciliation control run information.

If there is a discrepancy, additional data may be extracted from the Client Data Sources 112 and detailed results are passed to the Control Objects Data Model. Limits may be set of the number of detailed rows that will be extracted based. Results may be passed via the Connectivity between client and IGT Cloud Infrastructure 108 from the Client-based Virtual Infrastructure 111 to the Cloud Infrastructure 108. This information may then be stored in the control results tables. At the end of the run a trigger may be sent to the Governance Distribution Engine 104 for further processing.

Software code running in a Client-based Virtual Infrastructure 111 may distribute information about the status of a reconciliation control run. Results of a reconciliation control run along with information about the roles associated with the governance of the subject area, along with information about persons that are members of that role including their contact email or cell phone information, may be passed via the Connectivity between client and IGT Cloud Services 110 from the Cloud Infrastructure 108 to the Client-based Virtual Infrastructure 111. This data and process may constitute the Governance Distribution Map 114. The information may then be distributed to client staff based on the parameters in the Governance Distribution Map 114. The Governance Distribution Map 114 may enable the self-awareness of result distribution requirements to effective communicate to all stakeholders for any reconciliation control run results. The Governance Distribution Map 114 may be a dynamic component of the platform and may be programmatically derived based on the contents of the Information Governance Metadata Data Model 109.

Software code running in a Client-based Virtual Infrastructure 111 may present the reconciliation control dashboard. The dashboard may display the most recent reconciliation control runs based on the subject areas, the governance assigned to that subject area, the role associated with that governance assignment, and the user associated with that role resulting in a display of all reconciliation control runs that the user has a governance relationship to. The dashboard may display the name of the reconciliation control run, last run date, last update date for the control objects in the reconciliation control run, and status of the control using the data stored in reconciliation control run results tables. The dashboard may provide links to view detailed Control Reports 106 or view Incident Management Forms 107 for each reconciliation control run.

Software code running in a Client-based Virtual Infrastructure 111 may present control reports. Reports may include a Reconciliation Control Run Detail Report displaying the name and balances for each control object in the reconciliation control run as well as the variance amount if applicable using data stored in reconciliation control run results tables. The report may provide a color-coded indication of out of balance conditions. A Reconciliation Control Run Discrepancy report may show row by row detail of out of balance control objects where an out of balance condition occurs using data stored in reconciliation control run results tables. Additional historical reports may display trends based on the results of reconciliation control runs and allow queries of the results based on selected parameters.

Relational tables within the Information Governance Metadata Data Model 109 may store information about an incident that is associated with the results of a reconciliation control run. One table may store information about the incident such as date opened, data closed, person responsible, description, resolution notes, and status. Another table may tie an incident to one or more reconciliation control run results. Another table may allow assignments (tasks) to various users and would include due date, assignment description and assignment resolution. Another table may allow one or more notes to be provided for an assignment.

Software code running in a Cloud Infrastructure 108 may retrieve and save data related to an incident, the association of an incident with one or more reconciliation control runs assignments associated with an incident and notes related to assignments for an incident.

The Reconciliation Control Engine 103 may monitor the client infrastructure to determine when to execute a reconciliation control run. Criteria that would trigger a reconciliation control run may be timed schedules, trigger events, or manual execution. The Reconciliation Control Engine 103 may obtain the business rules that drive the business reconciliation requirements from the Information Governance Metadata Data Model 109. These business rules may include business logic for reconciliation rules, tolerance limits, and other criteria that are needed to determine if two or more occurrences of information or data are in sync. The Reconciliation Control Engine 103 may obtain the mapping between system of record and the various copies of data across the client data sources 112. This mapping may be stored in the Information Governance Metadata Data Model 109. The system of record (as stored in the governance metadata model 109 may be considered the point of truth, or the gold standard against which all replicated copies may be reconciled. The application may extract data (real or derived information) from the Client Data Sources 112 and store the data in the Controls Objects Data Model 113. These data values are considered control data objects.

The Reconciliation Control Engine 103 may apply the business logic defined in the Information Governance Metadata Data Model 109 across the specific control objects that are available in the Control Objects Data Model 113. The Reconciliation Control Engine 103 may pass the results of the reconciliation control run to the components of the Cloud Infrastructure 108, including, but not limited to, the Reconciliation Control Forms 102, the Reconciliation Control Dashboard 105, the Control Reports 106 and the Incident Management Forms 107.

The Reconciliation Distribution Engine 104 may trigger the components in the Cloud Infrastructure 108 to populate the Reconciliation Control Dashboard 105, based on business requirements stored in the Information Governance Metadata Model 109, with the results of the reconciliation control run. The Reconciliation Distribution Engine 104 may trigger the components in the Cloud Infrastructure 108 to populate the Control Reports 106 with the results of the reconciliation control run. Data on the Control Reports 106 may be based on the results of the control objects stored in the Control Objects Data Model 113, plus identification and classification details stored either in the Control Objects Data Model 113 and/or the Client Data Sources 112. The Reconciliation Distribution Engine 104 may trigger the components in the Cloud Infrastructure 108 to links the Control Reports 106 to the reconciliation control run results in the Reconciliation Control Dashboard 105. These links may provide drill paths for client staff to navigate from reconciliation control run summaries to the specific offending data or information causing the reconciliation variance.

The Reconciliation Control Engine 103 may work in conjunction with the components of the Cloud Infrastructure 108 to determine the Governance Distribution Map 114 based on the business rules stored in the Information Governance Metadata Data Model 109. The Governance Distribution Map 114 may be a key component of the platform. The Governance Distribution Map may provide the specific distribution requirements for the Control Report 106 based on the Information Governance stakeholders, including, but not limited to data owners, data stewards, data consumers, and data custodians. The Governance Distribution Engine 104 may obtain the content of the Reconciliation Control Dashboard 105, the Control Reports 106 and the Governance Distribution Map 114 for the reconciliation control run. The Reconciliation Control Engine 103 may pass the results of a reconciliation control run to the Reconciliation Distribution Engine 104. The Reconciliation Distribution Engine 104 may distribute the results of a reconciliation control run to the stakeholders as defined in the Information Governance Metadata Data Model 109.

The Reconciliation Distribution Engine 104 may be capable of distributing reconciliation control run results across many different mediums, including but limited to, email, posting on a client intranet site, transferring content to a client records retention system, or distributing results in computer readable format for input to another application. The Reconciliation Control Engine 103 may work in conjunction with the components of the Cloud Infrastructure 108 to determine the requirements for posting reconciliation variances in the Incident Management Forms 107. The business rules needed for posting reconciliation variances in the Incident Management Forms 107 may be stored in the Information Governance Metadata Data Model 109. The Reconciliation Control Engine 103 may work in conjunction with the components of the Cloud Infrastructure 108 to archive the results of the reconciliation control runs within the application for future client use such as trending and other analysis.

The Client Staff may maintain the disposition of addressing any control object variance through the Incident Management Forms 107. The Governance Distribution Engine 104 may use the Governance Distribution Map 114 to distribute updates to the Incident Management Forms 107 to the Information Governance stakeholders. Prior to executing a reconciliation control run, the Information Governance stakeholders may be determined and defined to the Information Governance Metadata Data Model 109. The Reconciliation Control Framework® implementation team may work with the Client Staff to define the Information Governance stakeholders for a subject area of data or information. These business rules may include, but not be limited to the data owner, data steward, data consumer, and data custodian are associated with the data subject area through input into the Information Governance Forms 101 which are resident on the Cloud Infrastructure 108.

III. PLATFORM OPERATION a. Organizational Information Mapping

A Client Staff, and other designated stakeholders, may use the embodiments of the present disclosure to determine the consistency of data or information across their organization. The Client Staff, and other designated stakeholders, may define the information governance stakeholders to the platform. These stakeholders may include, but are not limited to, the data owner, data steward, data consumer, and data custodian. The platform may execute reconciliation control runs across the client infrastructure and, in some embodiments, provide evidence of the consistency or variance of all control objects defined to the platform. In order to perform the control run operation, the platform may create an organizational information map. The platform may then proceed to verify certain control objects within the map to determine consistency or variance of data across the organization (e.g., client infrastructure).

Users (e.g., stakeholders) may be defined to the platform through the security module. A designated administrator with the Client Staff may access the security module via the components of the Information Governance Forms 101. The administrator may define users to the platform and grant the needed access rights. The implementation team may define the governance stakeholders needed for the platform to function. As mentioned above, these stakeholders may include, but are not limited to, the data owner, data steward, data consumer, and data custodian. The administrator, or delegate, may define the Information Governance stakeholder details to the platform by utilizing the components in the Information Governance Forms 101.

The implementation team may define the control objects and the business rules needed to execute a reconciliation control run. These control objects may include, but are not limited to, for example, key control measures, system of record, known copies and/or provisioning points, reconciliation tolerance requirements, business rules required for reconciliation controls to aggregate control objects or to apply other formulas, and the relationship between system of record control objects and known copies of those objects and/or provisioning points.

The control objects may be client objects that exist within the Client Data Sources 112 and/or defined as business rules to the platform. The administrator, or delegate, may define control object details to the platform by utilizing the components in the Information Governance Forms 101 and the Reconciliation Control Forms 102. The implementation team may define the required contents that are needed for the Reconciliation Control Forms 102, the Reconciliation Control Dashboard 105, the Control Reports 106 and the Governance Distribution Map 114. These contents may include, but are not limited to, attributes that should be displayed on the Reconciliation Control Dashboard 105, and the Control Reports 106.

This administrator, or delegate, may define the criteria to the platform using the Reconciliation Control Forms 102. The implementation team may define the contents of the Incident Management Forms 107. These contents may include, but not be limited to, the user preferences for creating incidents based on the size or number of variances identified during the reconciliation control runs, the amount of history to be retained, and the user security authorization and permissions to manage the incidents.

Figure 2:
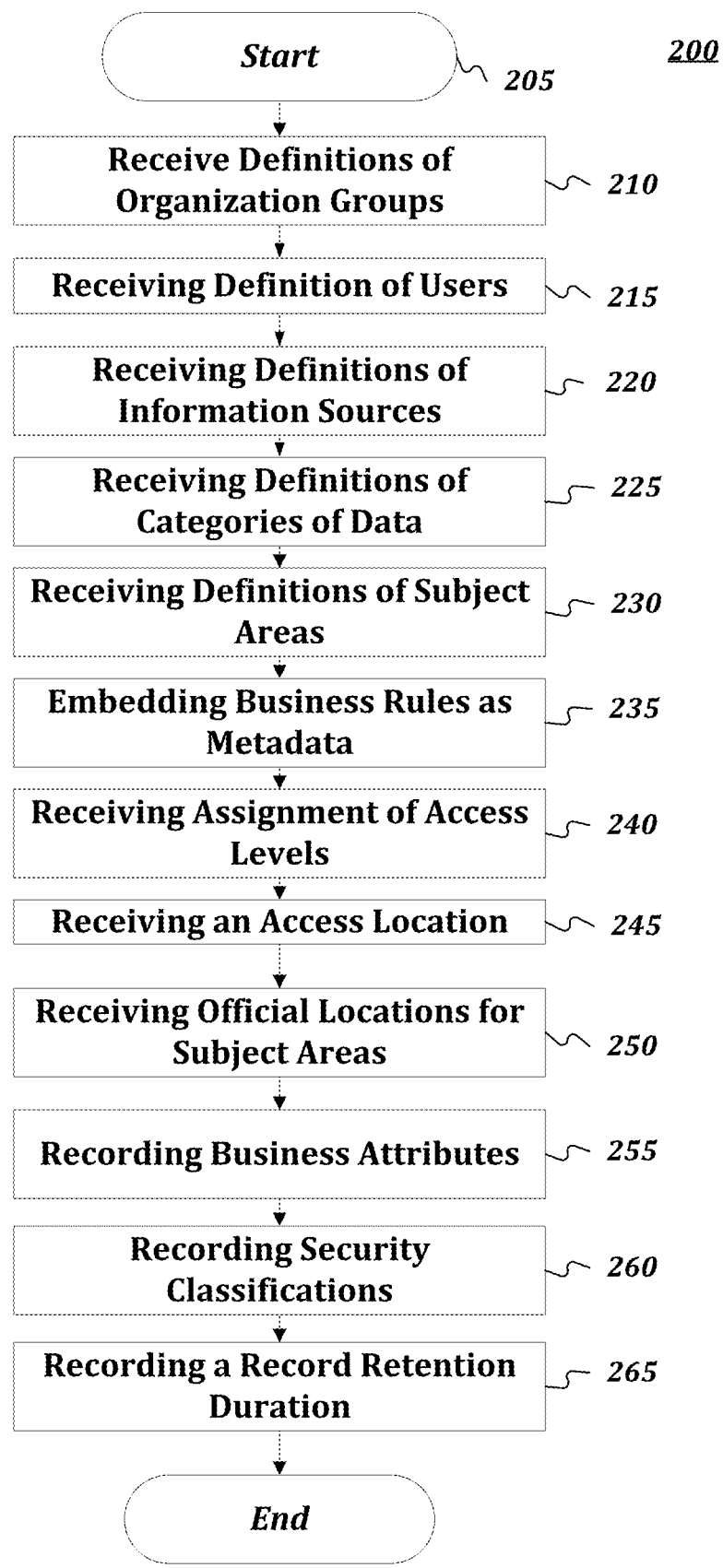
FIG. 2 is a flow chart of a method consistent with embodiments of the present disclosure for providing business relationship metadata and a framework for data access associated with platform 100.

FIG. 2 is a flow chart setting forth the general stages involved in a method 200 consistent with an embodiment of the disclosure for providing business relationship metadata and a framework for data access associated with platform 100. Method 200 may be implemented using a computing device 3500 as described in more detail below with respect to FIG. 35.

Although method 200 has been described to be performed by platform 100, it should be understood that computing device 3500 may be used to perform the various stages of method 200. Furthermore, in some embodiments, different operations may be performed by different networked elements in operative communication with computing device 3500. For example, a server may be employed in the performance of some or all of the stages in method 200. Moreover, a server may be configured much like computing device 3500.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 200 will be described in greater detail below.

Figure 3:
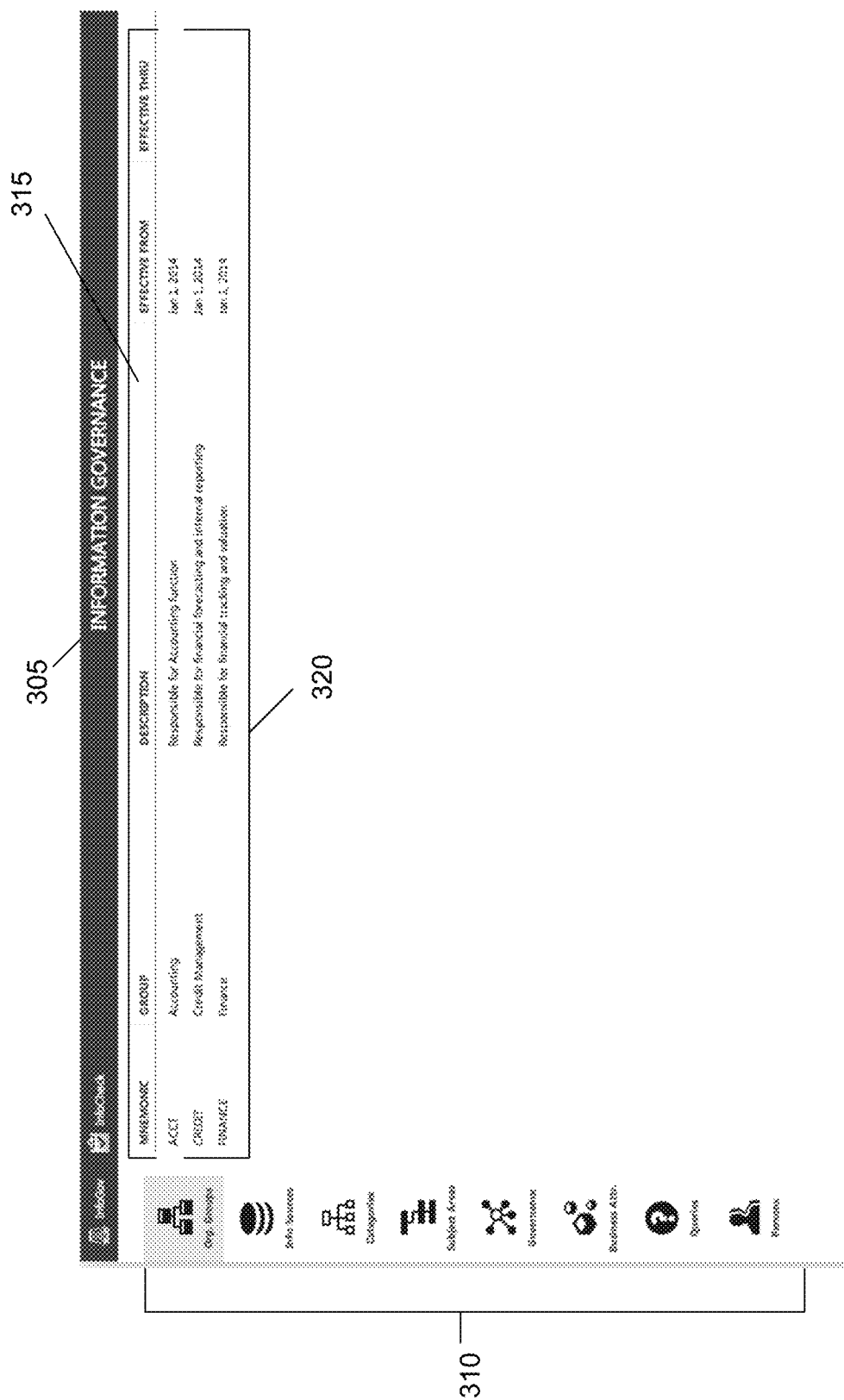
FIG. 3 illustrates an embodiment of an interface consistent with the present disclosure for receiving user access to organization groups and their associated properties.

Method 200 may begin at starting block 205 and proceed to stage 210 where platform 100 may receive definitions of organization groups. For example, organization groups may include Accounting, Credit Management and Finance. Information associated with such organization groups may be embedded as metadata associated with each organization group, such as, for example, a pneumonic, a description, and effective from and thru dates. Each group may be given certain access capabilities, such as, for example, read and write access for certain data. FIG. 3 illustrates an embodiment of an interface consistent with the present disclosure for receiving user access to organization groups and their associated properties. Title block 305 may inform the user as to the current application. Menu selection 310 may inform the user as to the current menu as well as allow the user to navigate menus. Metadata description 315 may show the user what types of data are associated with the current menu. Metadata 320 may show the user what information is stored within the selected set of data.

Figure 4:
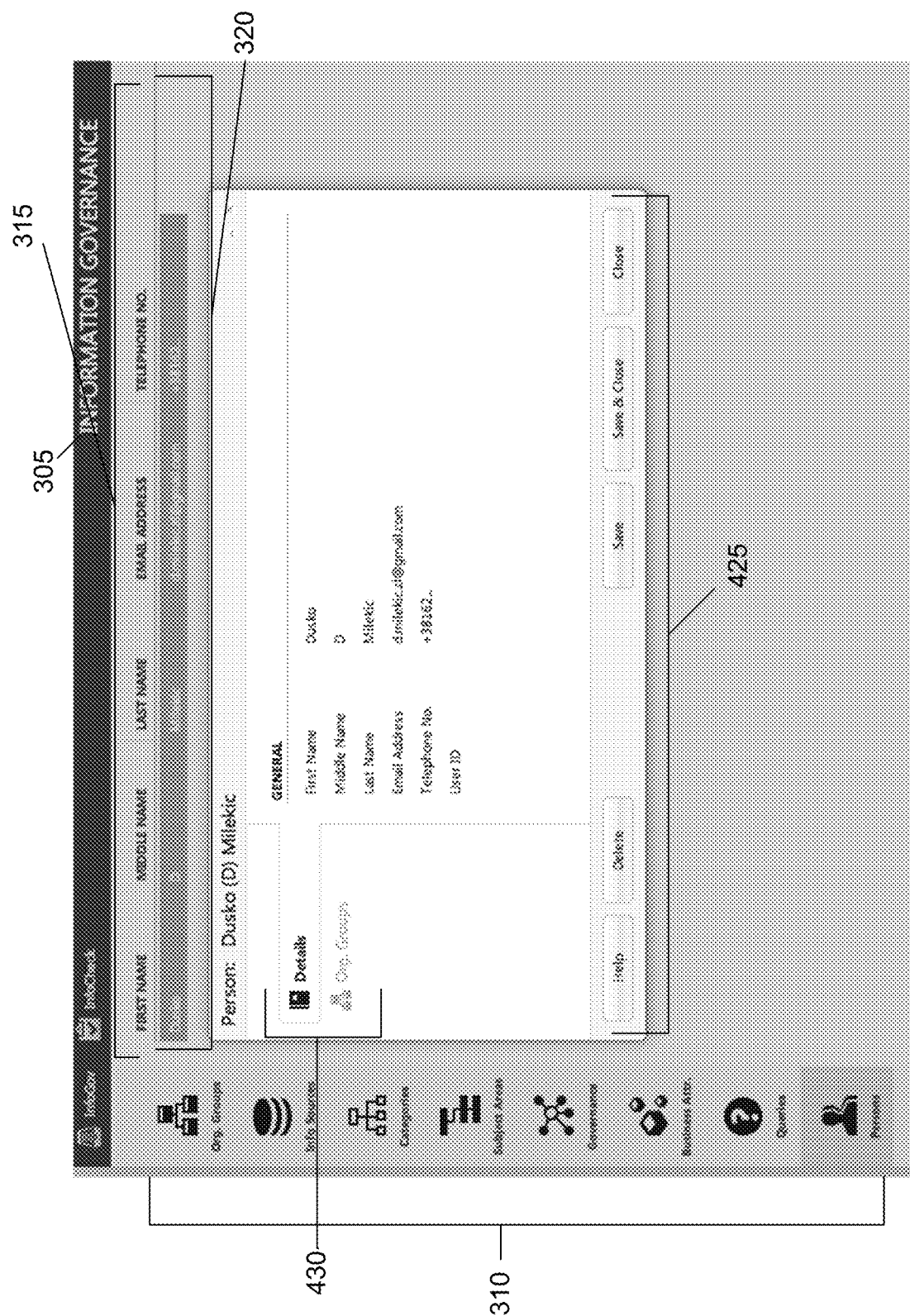
FIG. 4 illustrates an embodiment of an interface for receiving definitions of users
Figure 5:
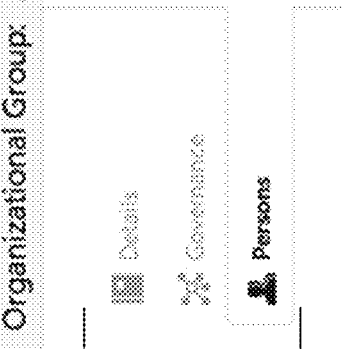
FIG. 5 illustrates another embodiment of an interface for receiving definitions of users.

From stage 210, where platform 100 receives organization groups and associated information, method 200 may advance to stage 215 where platform 100 may receive definitions of users. Each user may be associated with at least one organization group. Each user's definition may include, for example, name, contact information and user identification. Each user may be given certain access capabilities, such as, for example administrative access or read and write access for certain data. FIGS. 4 and 5 illustrate embodiments of an interface for receiving definitions of users. Navigation buttons 425 may enable the user to navigate the application. Submenu selection 430 may enable the user to navigate between submenus.

Figure 6:
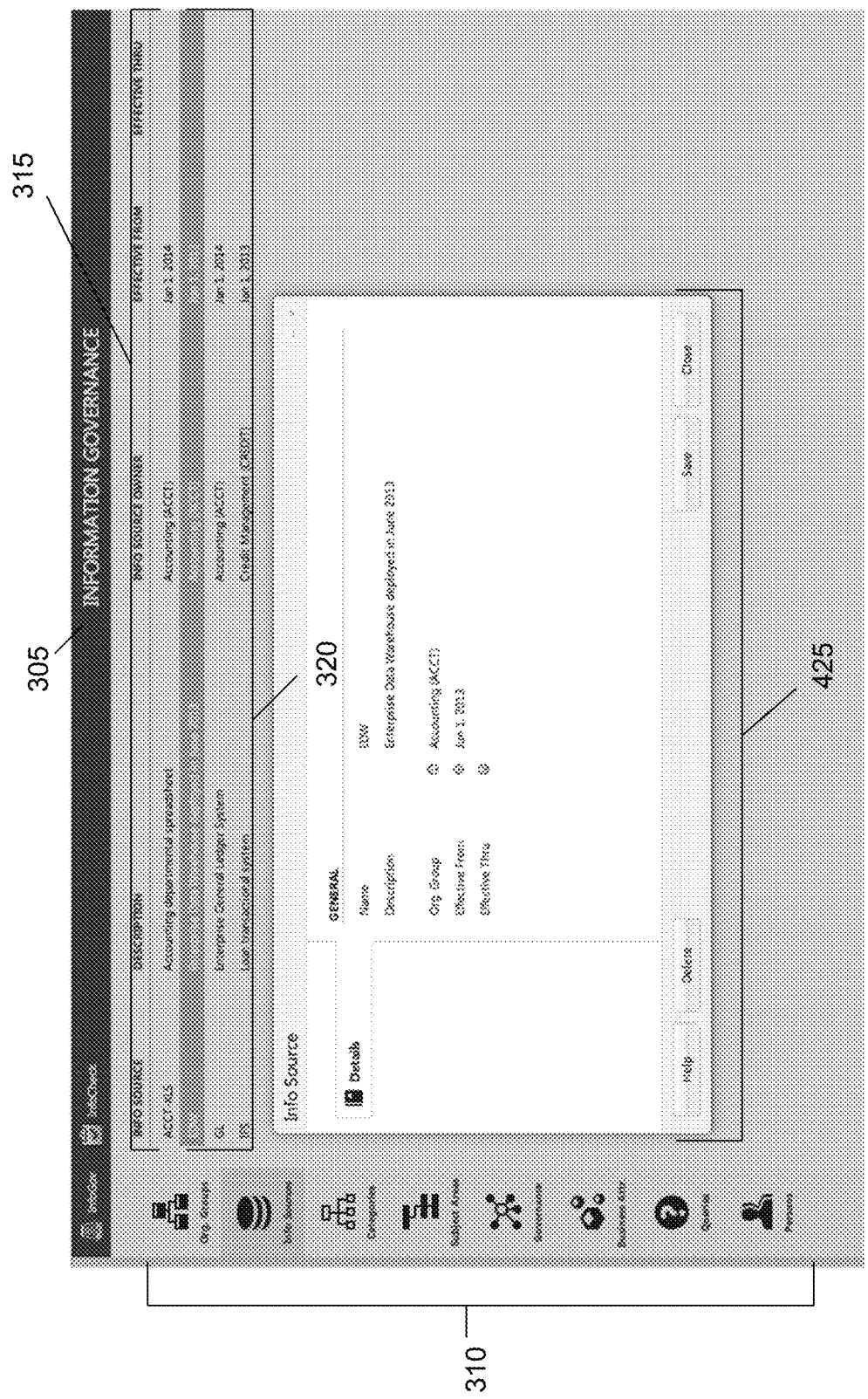
FIG. 6 illustrates an embodiment of an interface for receiving definitions of information sources. Information sources may be further embedded with metadata.

Once platform 100 receives definitions of users in stage 215, method 200 may continue to stage 220 where platform 100 may receive definitions of information sources. For example, information sources may be comprised of for example, spreadsheets or MS Access® databases. Information sources may in part comprise an organizational information map. Information sources may be described in business terminology. FIG. 6 illustrates an embodiment of an interface for receiving definitions of information sources. Information sources may be further embedded with metadata. Such metadata may include, for example, a description, an information source owner and effective from and thru dates.

Figure 7:
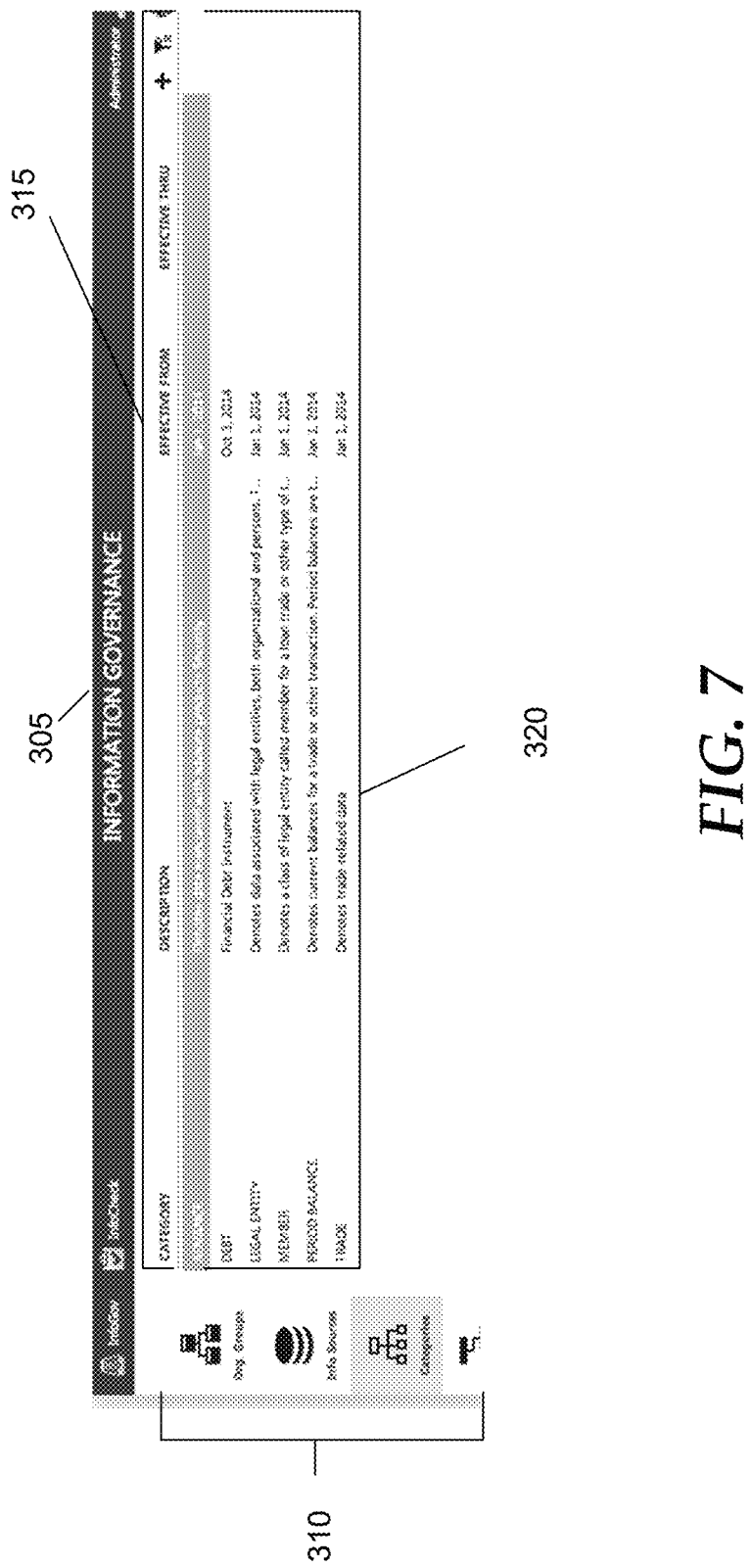
FIG. 7 illustrates an embodiment of an interface for receiving definitions of categories of data.

Once platform 100 receives definitions of information sources in stage 220, method 200 may continue to stage 225 where platform 100 may receive definitions of categories of data. FIG. 7 illustrates an embodiment of an interface for receiving definitions of categories of data. Categories may be used to describe broad groupings of data or information. Categories may be further embedded with associated metadata, such as, for example, a description and effective from and thru dates.

Figure 8:
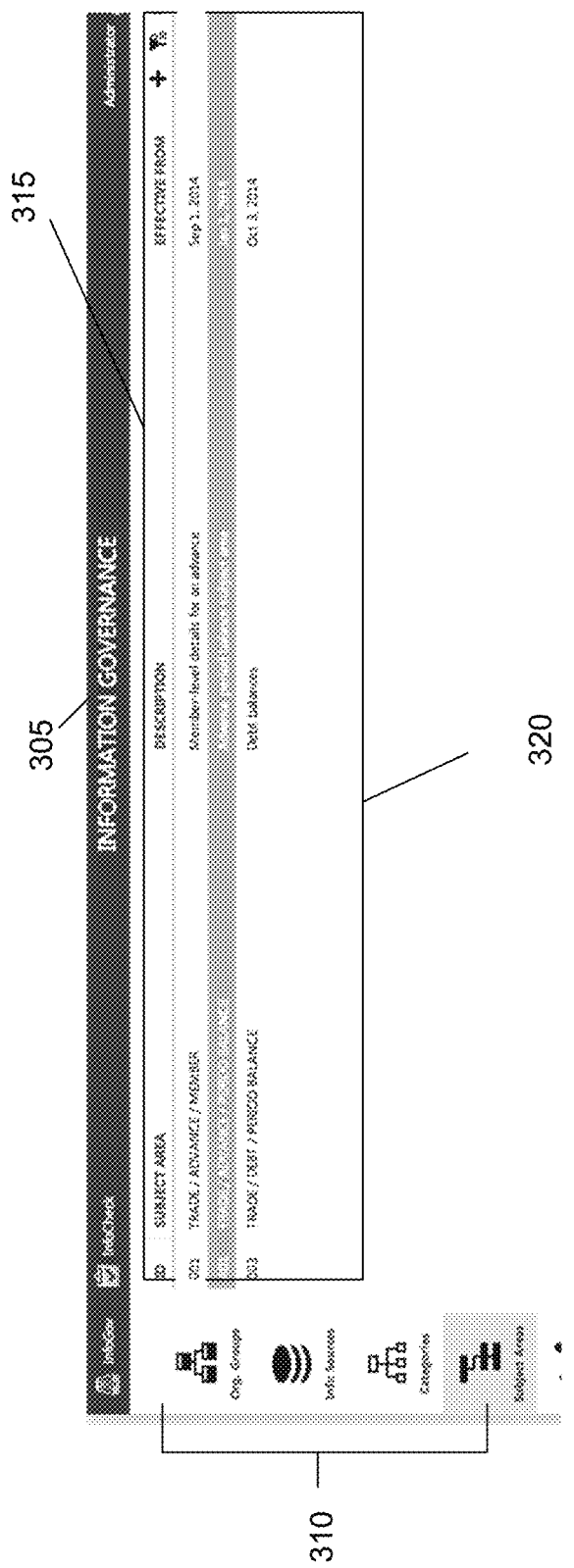
FIG. 8 illustrates an embodiment of an interface for receiving definitions of subject areas of data.
Figure 9:
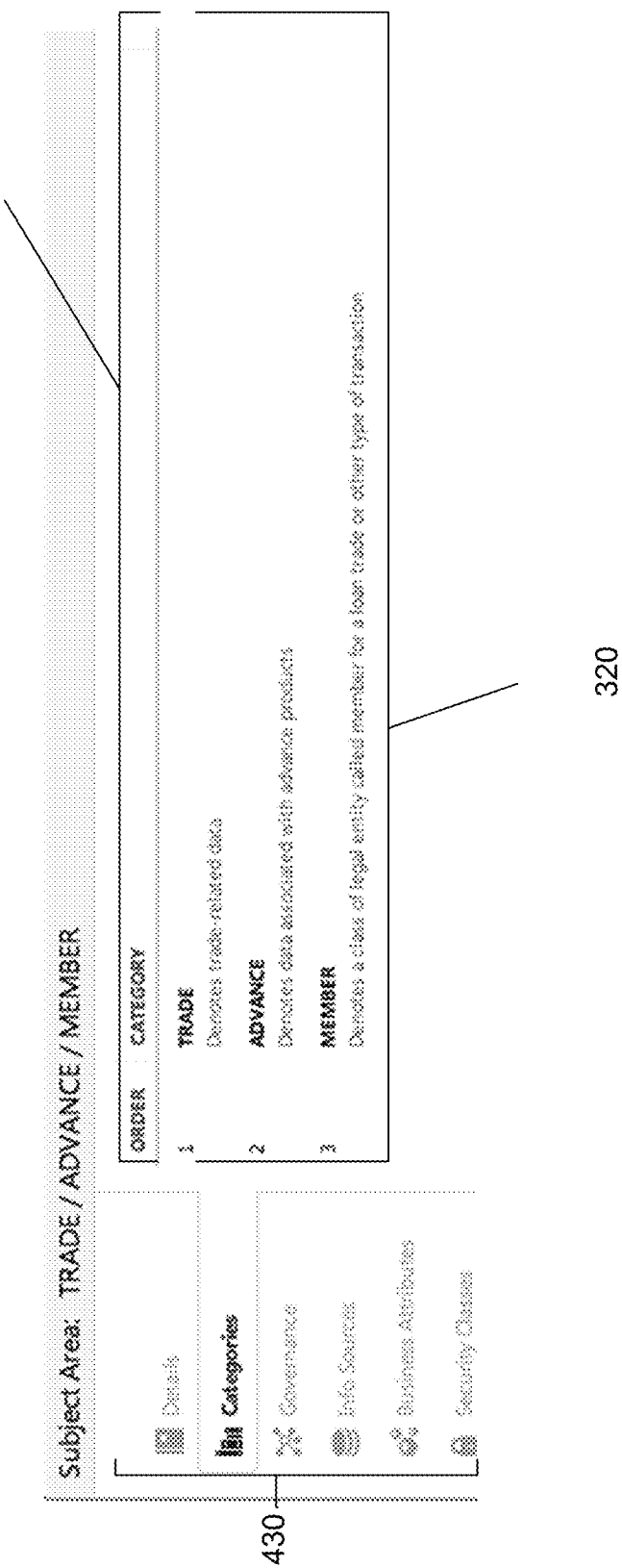
FIG. 9 illustrates an embodiment showing order of categories.

Once platform 100 receives definitions of subject areas in stage 225, method 200 may continue to stage 230 where platform 100 may receive definitions of classes of data. Such classes of data may be associated with one or more categories. FIG. 8 illustrates an embodiment of an interface for receiving definitions of subject areas of data. Subject areas may be used in information governance associated with each organization group. Further, subject areas may be used to determine the mapping of data. Categories may be reordered and rearranged. FIG. 9 illustrates an embodiment showing order of categories.

Once platform 100 receives definitions of classes in stage 230, method 200 may continue to stage 235 where platform 100 may embed business rules as metadata. FIG. 10 illustrates an embodiment of an interface for embedding business rules as metadata. Such metadata may be associated with a subject area. This metadata may include, for example, governance, official information sources, associated business attributes, security classification and records retention requirements (e.g. duration).

Figure 11:
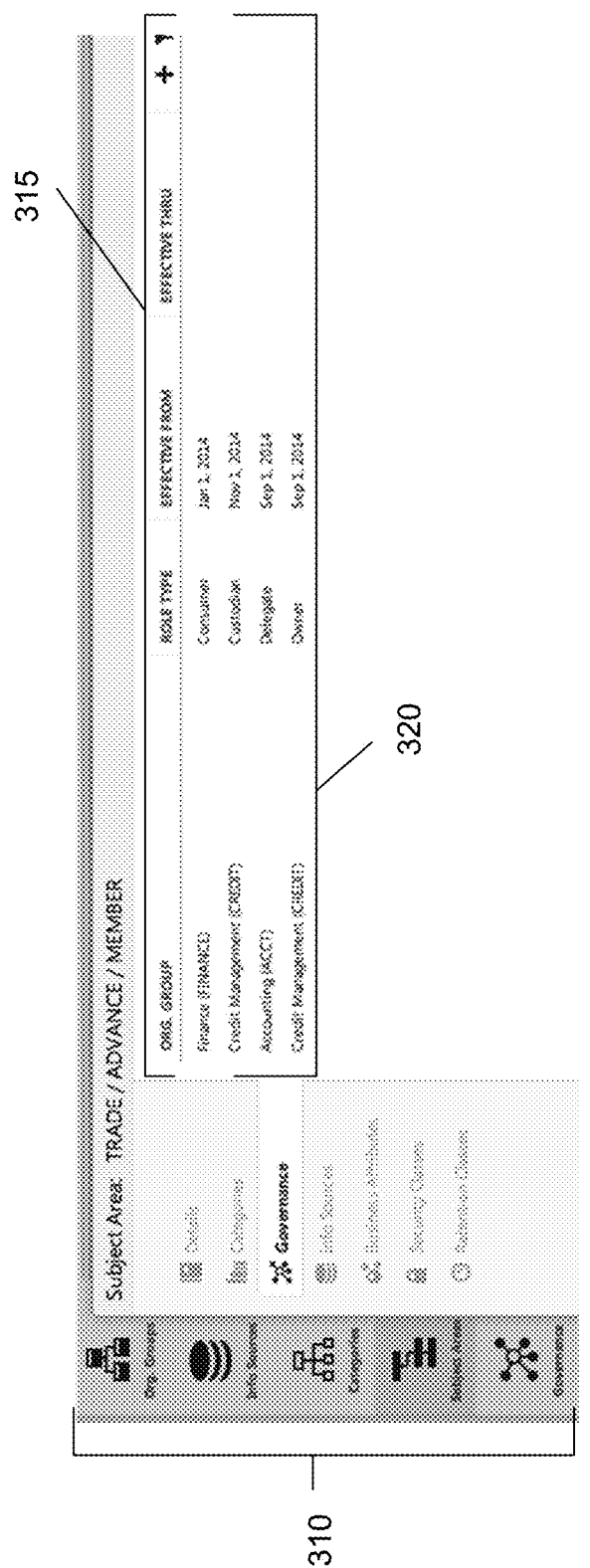
FIG. 11 illustrates an embodiment of an interface for receiving assignments of access levels.

Once platform 100 embeds business rules as metadata in stage 235, method 200 may continue to stage 240 where platform 100 may receive assignments of access levels. FIG. 11 illustrates an embodiment of an interface for receiving assignments of access levels. The platform may use the relationship between subject areas and organization groups to determine association type. The relationships may include, for example, but not limited to, consumer (i.e. one who uses the data/information within the subject area), owner (i.e. one who has responsibility for the definition, quality and business rules regarding the content of the subject area), delegate (i.e. one who has been assigned responsibility), and custodian (i.e. one responsible for storage of the data/information). Such association may provide an amount of access to data, such as, for example, access to read certain data or access to write certain data.

Figure 12:
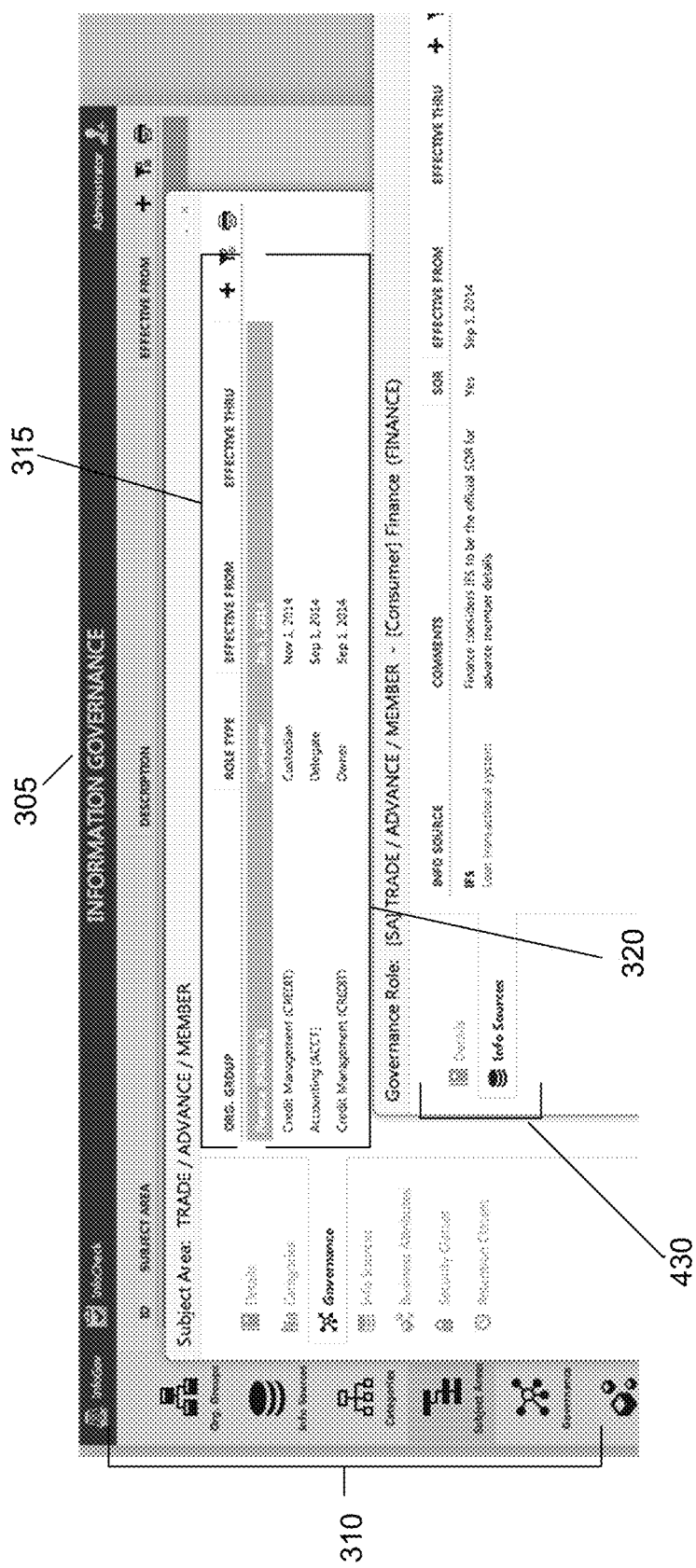
FIG. 12 illustrates an embodiment of an interface for providing a user with a platform for embedding as metadata locations from where content is obtained as well as whether or not the user believes that the source is official.

Once platform 100 receives assignments of access levels in stage 240, method 200 may continue to stage 245 where platform 100 may record locations from where content is obtained. The platform may also enable the user to record if he/she believes that the source is the official information source. FIG. 12 illustrates an embodiment of an interface for providing a user with a platform for embedding as metadata locations from where content is obtained as well as whether or not the user believes that the source is official.

Figure 13:
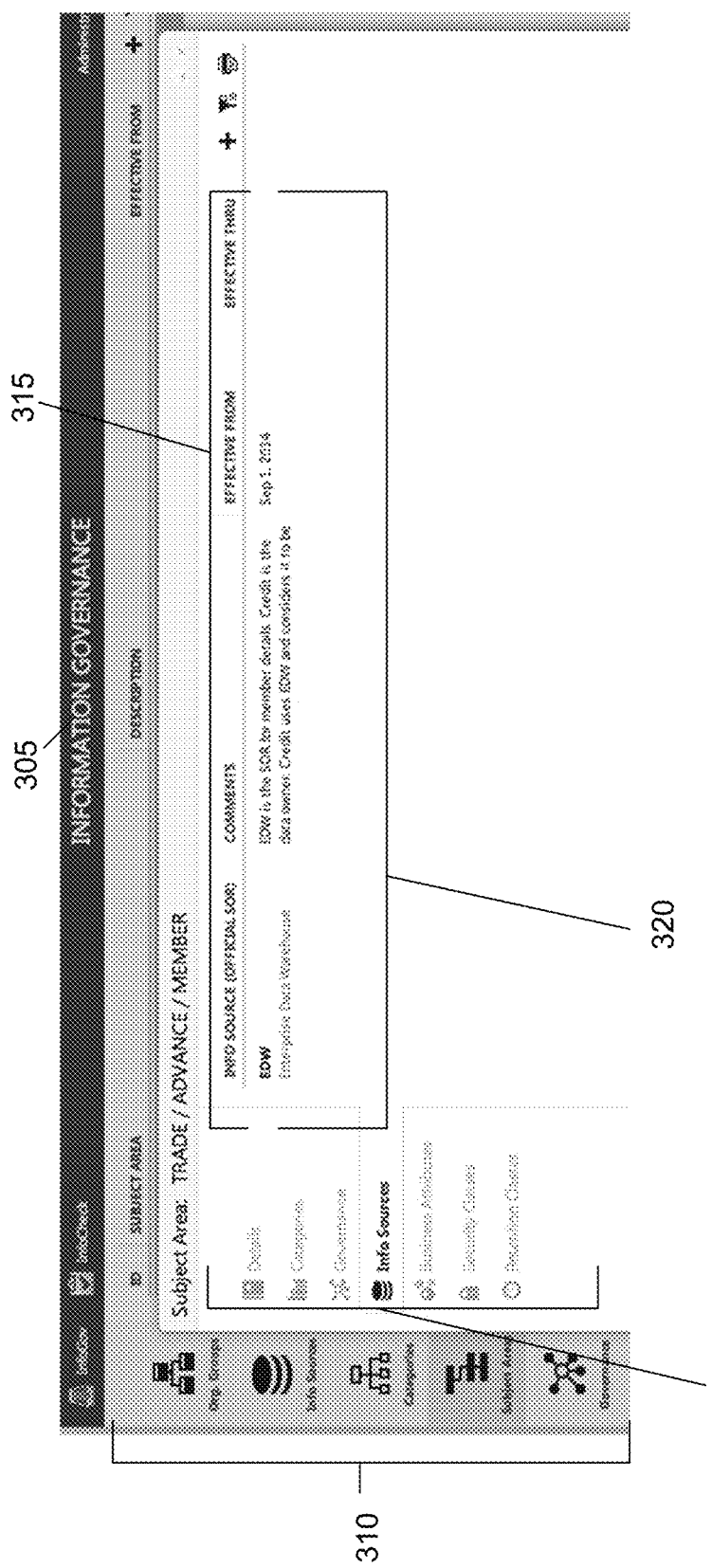
FIG. 13 illustrates an embodiment of an interface for displaying the official information source.

Once platform 100 records locations from where content is obtained in stage 245, method 200 may continue to stage 250 where platform 100 may record official locations for content for each subject area. Using this information, the platform may record where a user gets information for an official or unofficial source. FIG. 13 illustrates an embodiment of an interface for displaying the official information source.

Figure 14:
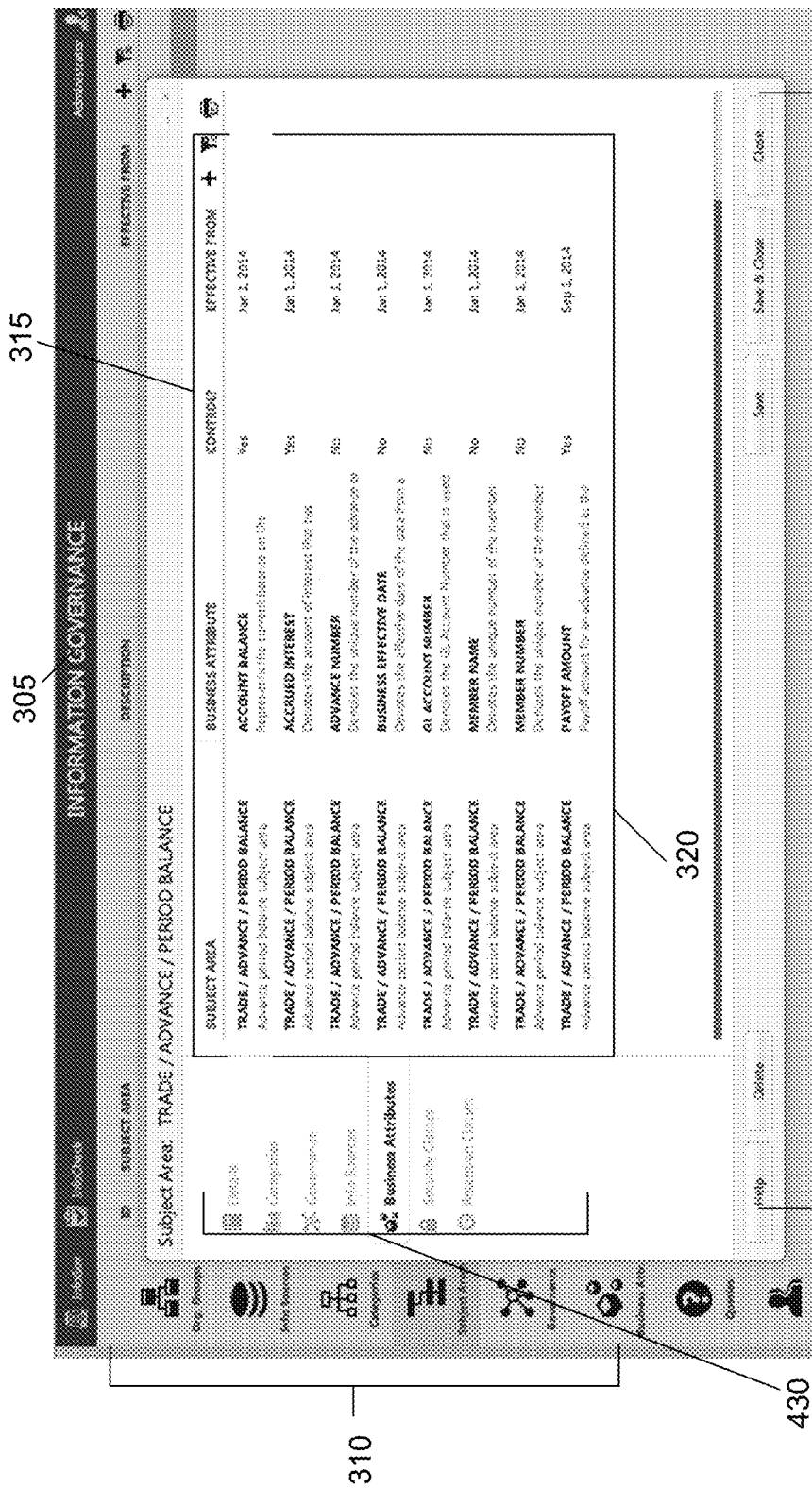
FIG. 14 illustrates an embodiment of an interface for displaying business attributes.

Once platform 100 records official locations for content in stage 250, method 200 may continue to stage 255 where platform 100 may record business attributes that are of key relevance to each subject area. Business attributes may comprise the information architecture tier of the organization. In some cases, business attributes may be control attributes. Such control attributes may provide confidence that the data are consistent. For example, data may be compared to control attributes to see that the values are consistent. FIG. 14 illustrates an embodiment of an interface for displaying business attributes. This embodiment displays the combined governance view of all registered stakeholders.

Figure 15:
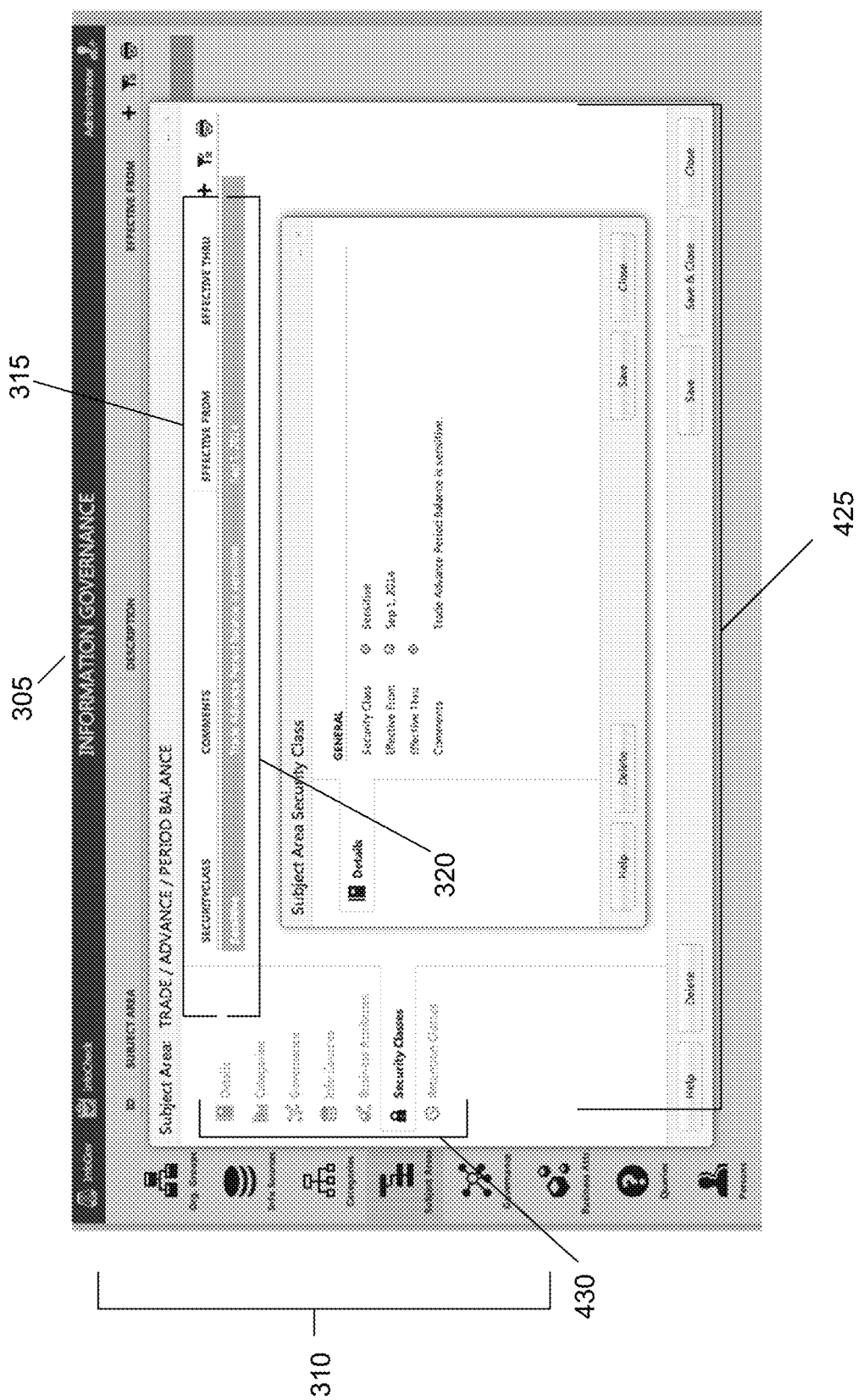
FIG. 15 illustrates an embodiment of an interface for viewing security information.

Once platform 100 records business attributes in stage 255, method 200 may continue to stage 260 where platform 100 may record security classifications (e.g. sensitive, private, public, personal identifier) for subject areas. Such security classifications may in part comprise business rules. The security classification may enable users to include or exclude access to certain data for certain users, groups or organizations. Further, the security classification may enable users to run reports based on the security classifications. Such reports may include which organization group used content of a particular security classification and from where such content was obtained. FIG. 15 illustrates an embodiment of an interface for viewing security information.

Figure 16:
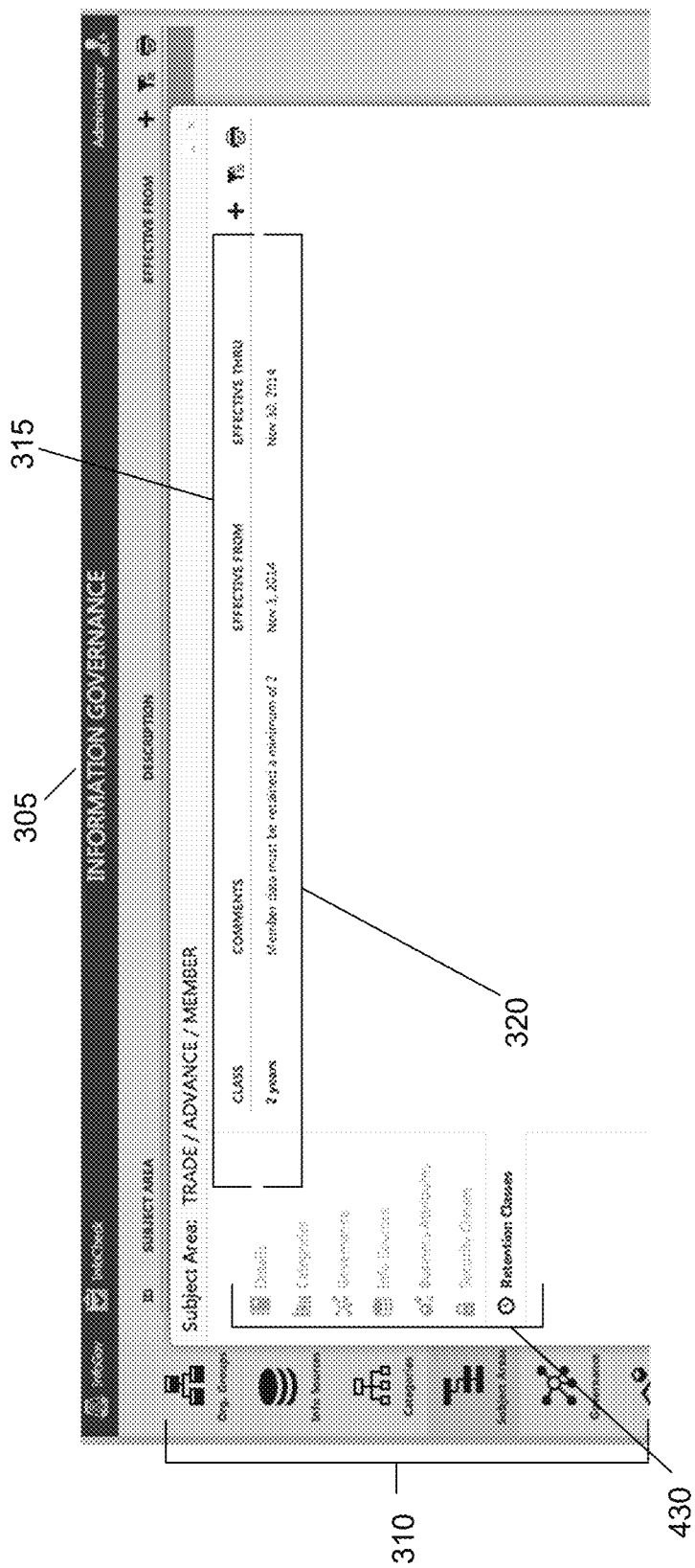
FIG. 16 illustrates an embodiment of an interface for viewing record retention durations.

Once platform 100 records security classifications in stage 260, method 200 may proceed to stage 265, where platform 100 may record a record retention duration (e.g. 2 years, 3 years, 7 years). Such record retention duration may correspond to, for example, a duration required for compliance, eDiscovery, or other legal matters. FIG. 16 illustrates an embodiment of an interface for viewing record retention durations.

b. Control Run Execution

This administrator, or delegate, may define the criteria to the platform using the Reconciliation Control Forms 102 and/or the Incident Management Forms 107. The implementation team may define the parameters that are required to execute a reconciliation control run. These parameters may include, but are not limited to, a scheduled event based on a data/time, a triggered event based on integration with an external scheduling tool or other trigger, or triggered by a manual request. This administrator, or delegate, may define the criteria to the platform using the Reconciliation Control Forms 102.

The Reconciliation Control Engine 103 may monitor the need to execute a reconciliation control run. Upon execution of a reconciliation control run, the Client Staff, and other designated stakeholders, may receive the results of the reconciliation control runs as depicted within the Governance Distribution Map 114. The Client Staff, and other designated stakeholders may receive the results of the reconciliation control runs from, but not limited to, the Reconciliation Control Dashboard 105, the Control Reports 106, or the Incident Management Forms 107. The Client Staff, and other designated stakeholders, may follow defined information governance policies and procedures to resolve any reconciliation variances identified in the reconciliation control run. The Client Staff, and other designated stakeholders may utilize the Incident Management Forms 107 to update the status and disposition of any reconciliation variances identified in the reconciliation control run.

Additionally, the Client Staff, and other designated stakeholders may utilize the platform to obtain a historic perspective and trending of any reconciliation variances identified in the reconciliation control run. The Client Staff, and other designated stakeholders, may access Reconciliation Control Dashboard 105, the Control Reports 106 and the Incident Management Forms 107. The Client Staff, and other designated stakeholders, may utilize the platform historic perspective and trending for targeted input into business process engineering, enterprise data management initiatives, or business intelligence initiatives. The information provided by the platform may be used to improve automated reporting, make advancements on an information governance maturity model, and improve operational efficiency.

Figure 17:
FIG. 17 is a flow chart setting forth the general stages involved in a method 1700 consistent with an embodiment of the disclosure for checking data associated with platform 100 for consistency.

FIG. 17 is a flow chart setting forth the general stages involved in a method 1700 consistent with an embodiment of the disclosure for checking data associated with platform 100 for consistency. Method 1700 may be implemented using a computing device 3500 as described in more detail below with respect to FIG. 35.

Although method 1700 has been described to be performed by platform 100, it should be understood that computing device 3500 may be used to perform the various stages of method 1700. Furthermore, in some embodiments, different operations may be performed by different networked elements in operative communication with computing device 3500. For example, a server may be employed in the performance of some or all of the stages in method 1700. Moreover, a server may be configured much like computing device 3500.

Figure 18:
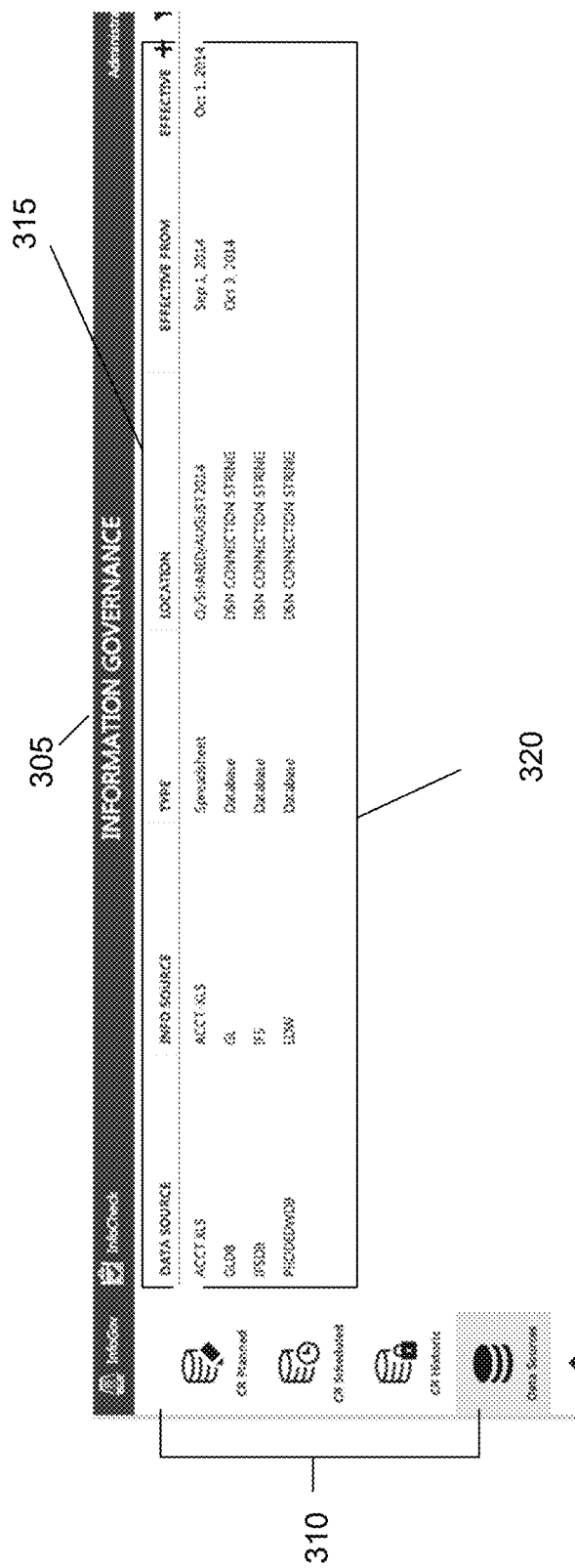
FIG. 18 illustrates an embodiment of a user interface showing data sources that have been received and mapped within the system.

Method 1700 may begin at starting block 1705 and proceed to stage 1710, where platform 100 may receive physical data structure definitions. Such physical structures may include, for example, databases, spreadsheets, xml data sources, web services, or any technical interface where data is located. The physical data sources may then be mapped back to the information source. The mapping may associate information sources to the corresponding technical implementations. FIG. 18 illustrates an example of a user interface showing data sources that have been received and mapped within the system.

From stage 1710, where platform 100 receives physical data structure definitions, method 1700 may proceed to stage 1715, where platform 100 receives definitions of control runs. Control runs may include comparisons between two or more control objects. Such control objects may be within one data source or across multiple data sources.

Figure 19:
FIG. 19 illustrates an embodiment of a user interface showing series of control runs that are defined in the system.

Control runs may be comprised of at least one of the following components: a task, controls, incidents, control results and logs. A task may include actions needed to fetch data from one or more data sources. Controls may include system logic that is used for reconciliation comparisons. Incidents may include workflow tracking to resolve inconsistencies identified within the data or information sources. Control results may include run-by-run results on historic, executed control runs. Logs may include audit logs or historic, executed controls (e.g. status, time, history). FIG. 19 illustrates an embodiment of a user interface showing series of control runs that are defined in the system.

Figure 20:
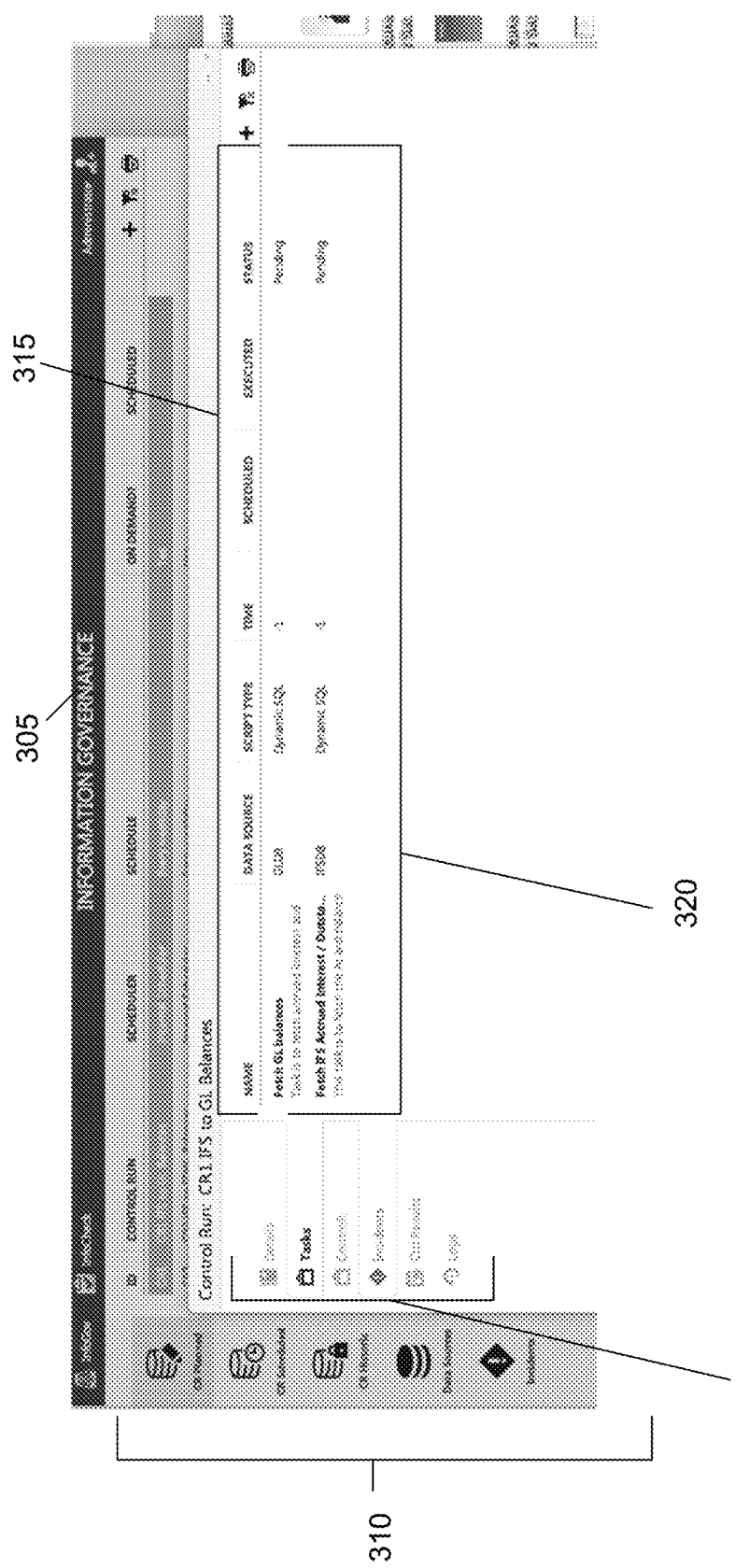
FIG. 20 illustrates an embodiment for displaying task definitions.
Figure 21:
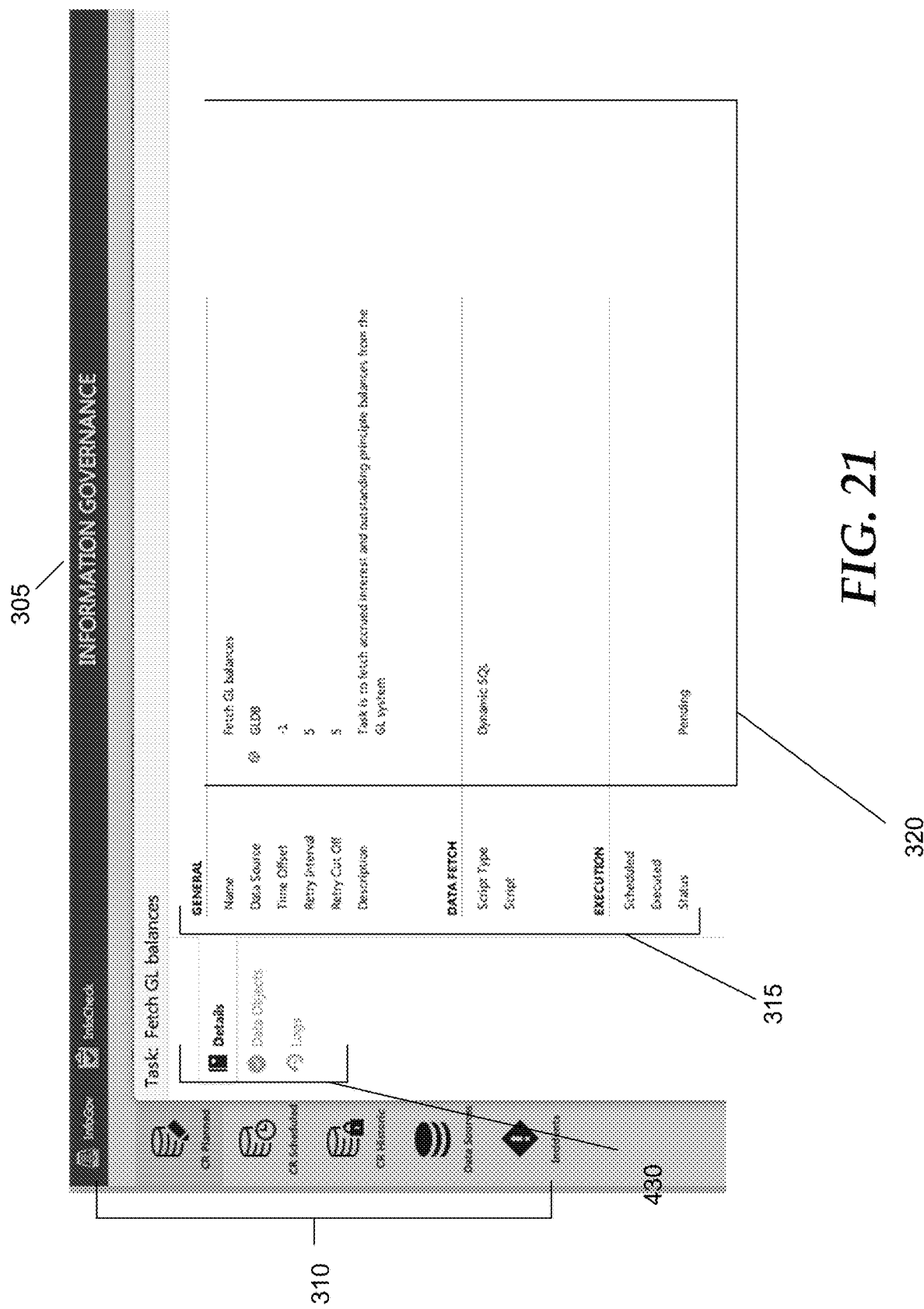
FIG. 21 illustrates further details from one of the example tasks of FIG. 20.
Figure 22:
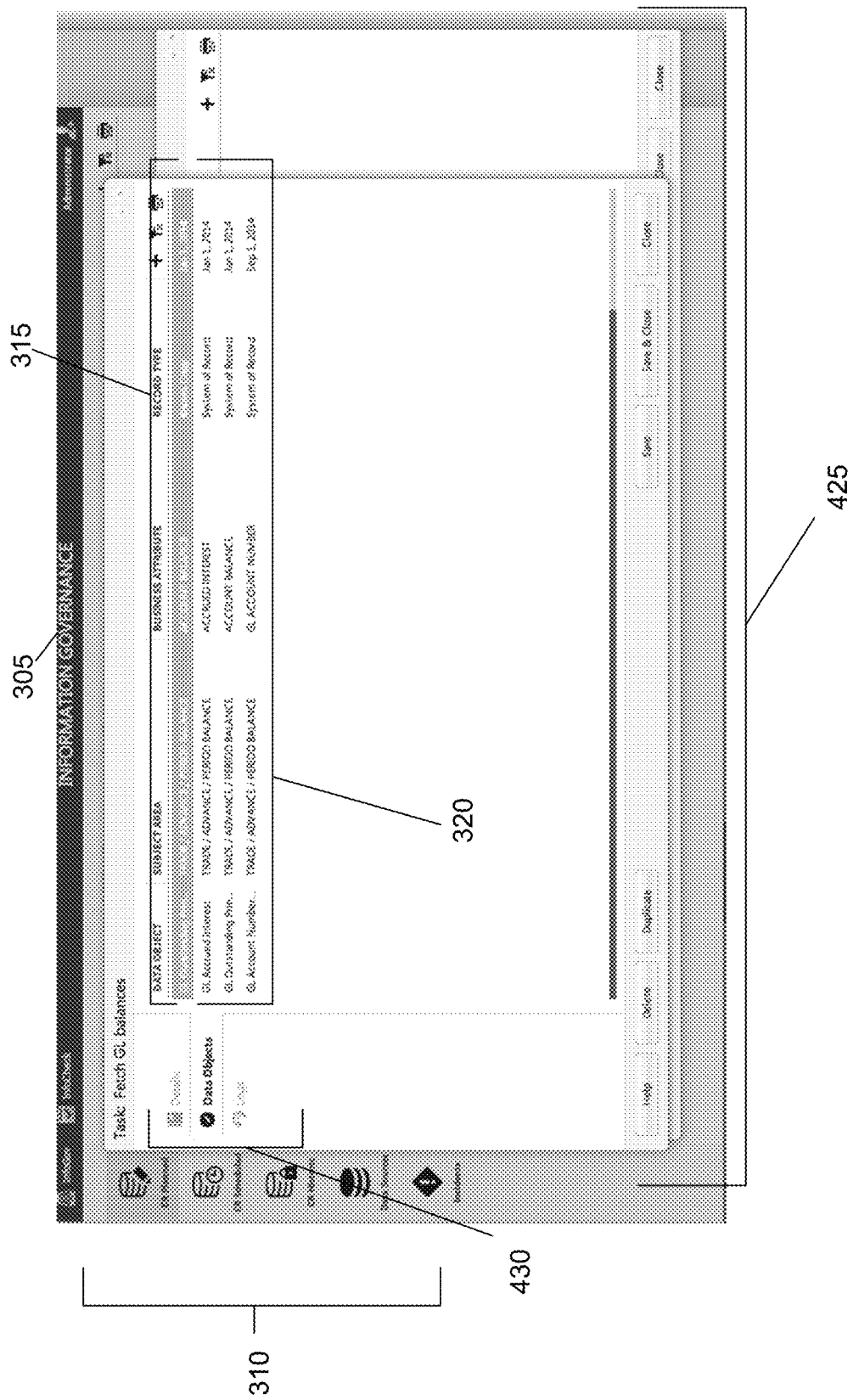
FIG. 22 illustrates an embodiment of a user interface showing the data objects to be retrieved.
Figure 23:
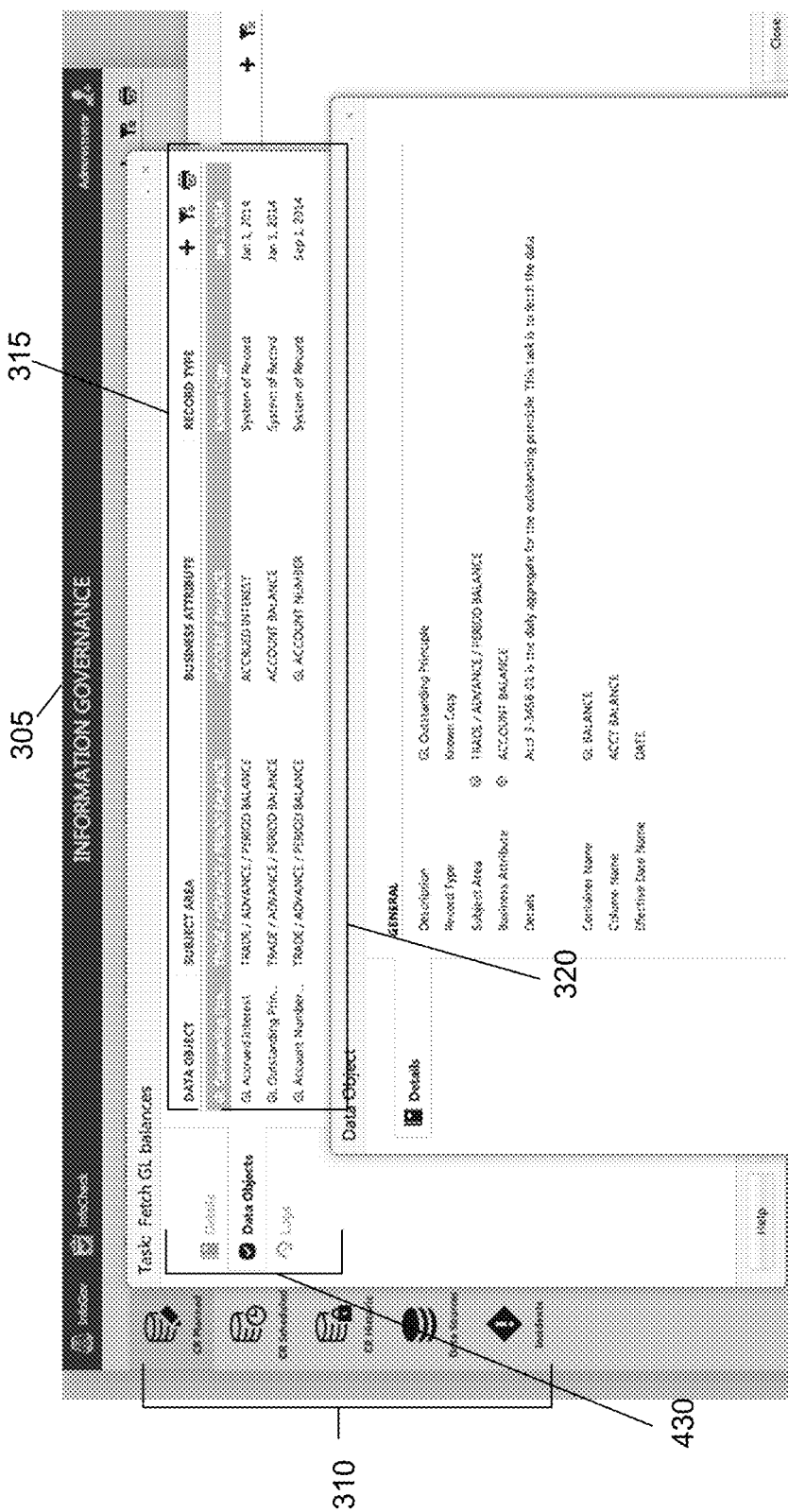
FIG. 23 illustrates an embodiment of a user interface showing the further information pertaining to the data objects.
Figure 24:
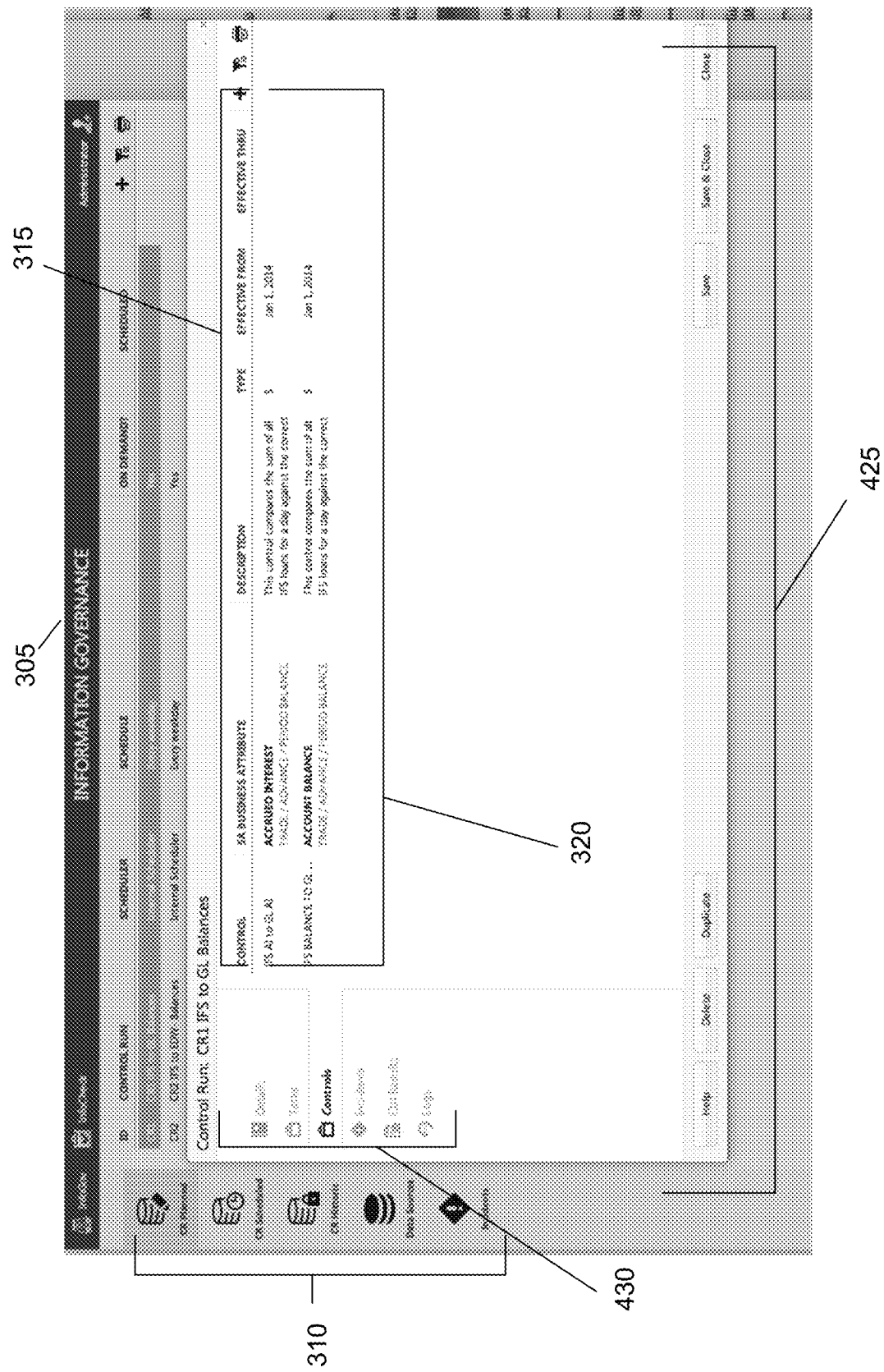
FIG. 24 illustrates an embodiment of a user interface for showing descriptions of controls.
Figure 25:
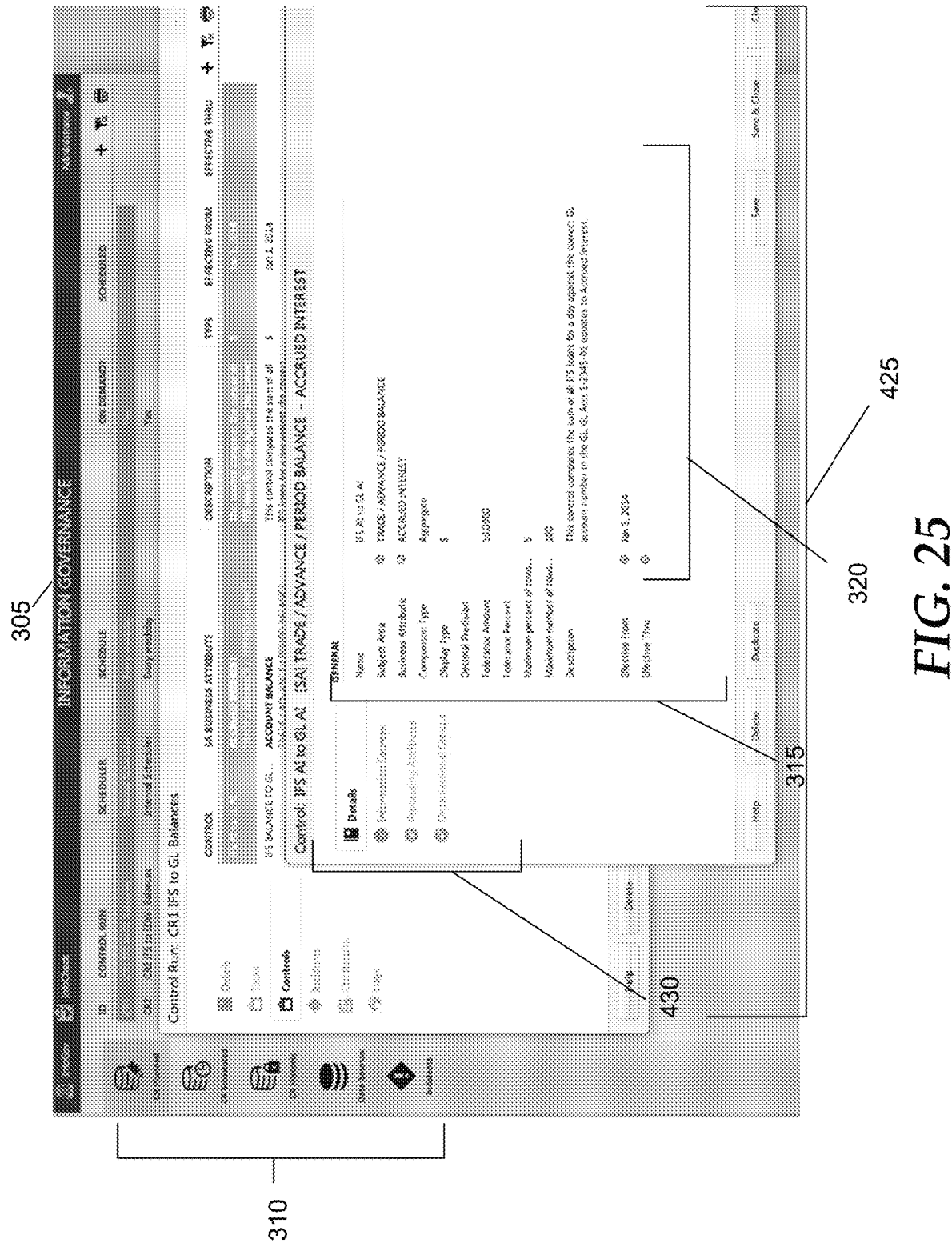
FIG. 25 illustrates an embodiment of a user interface for showing details of a control.

A task definition may include, for example, a name, description, data source, script type and status. FIG. 20 illustrates an embodiment for displaying task definitions. FIG. 21 illustrates further details from one of the example tasks of FIG. 20. A control definition may include, for example, the type of comparison to be executed, the tolerance levels, the precision levels, and further useful information pertinent to users of control run results (e.g. the number or percent of rows to be returned in the event of an error). FIG. 22 illustrates an embodiment of a user interface showing the data objects to be retrieved. Such retrieved objects may be compared in the course of a control run. FIG. 23 illustrates an embodiment of a user interface showing the further information pertaining to the data objects. Such information may include exact location of data, such as, for example, the cell in a spreadsheet. FIG. 24 illustrates an embodiment of a user interface for showing descriptions of controls. In this example, one of the control runs will compare IFS AI to GL AI. FIG. 25 illustrates an embodiment of a user interface for showing details of a control. In this example, the tolerance amount is shown to be $10. If the figures are within $10, the control may show a passing result; if the figures differ by more than $10 the control may show a failing result.

Figure 26:
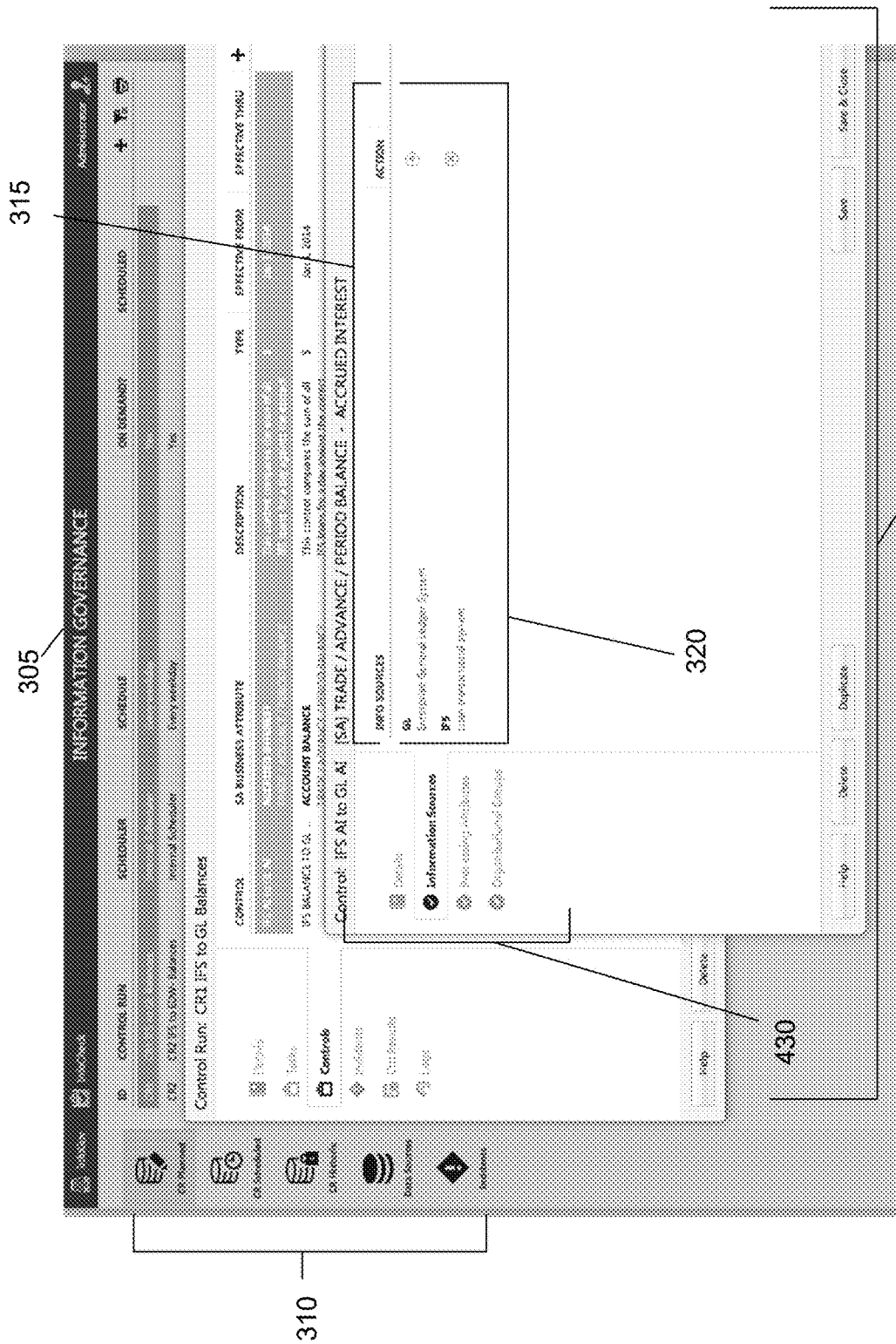
FIG. 26 illustrates an embodiment of a user interface for showing information sources.

FIG. 26 illustrates an embodiment of a user interface for showing information sources. Information source is captured in the language of the business and represents the business view of the information and data landscape. Information sources may be typical production transactional systems such as loan process, inventory, trading, or general ledger system. Information sources may also be end-user computing applications (EUC) tools such as spreadsheets of business-developed databases or reporting application.

Figure 27:
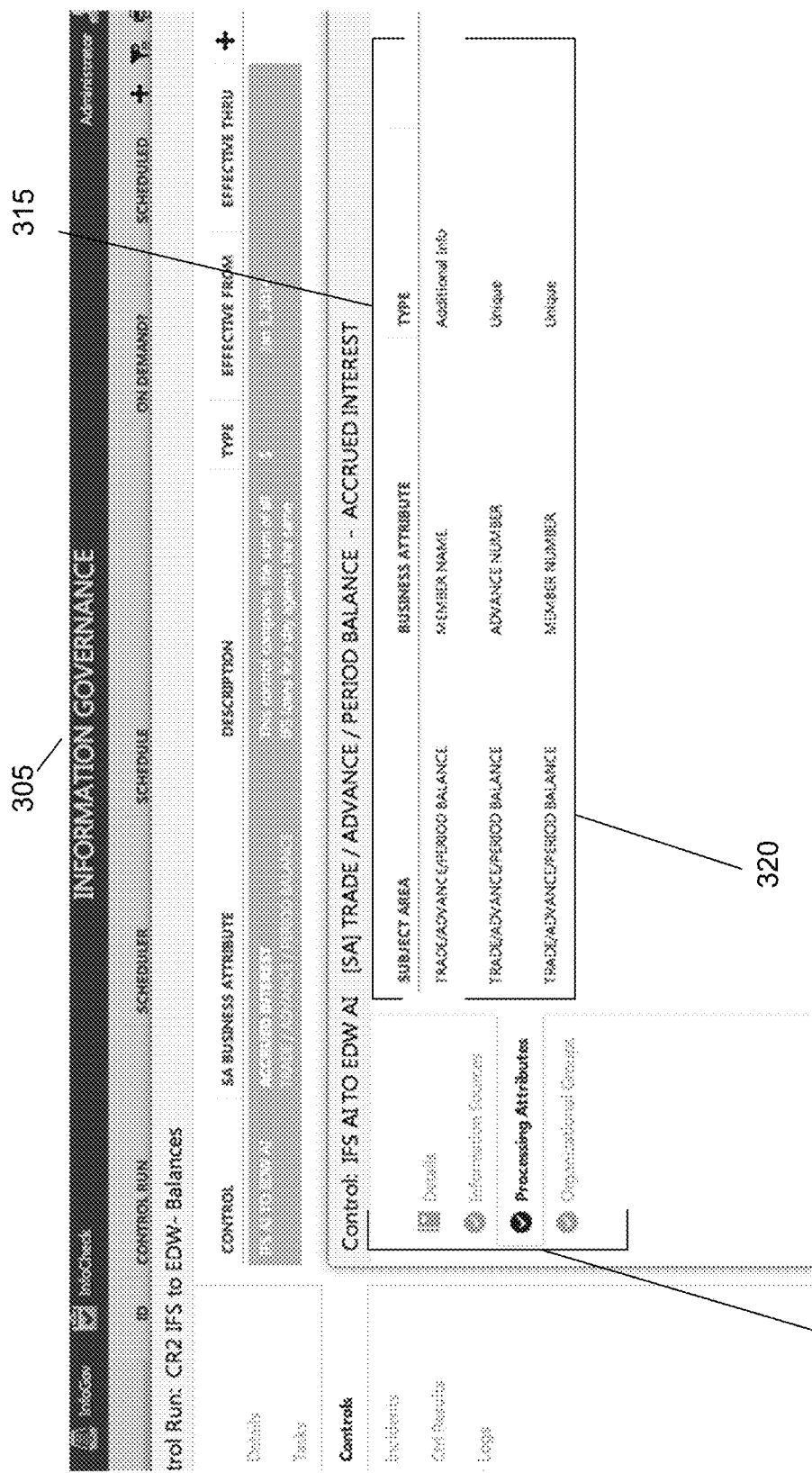
FIG. 27 illustrates an embodiment of a user interface for showing process attributes.
Figure 28:
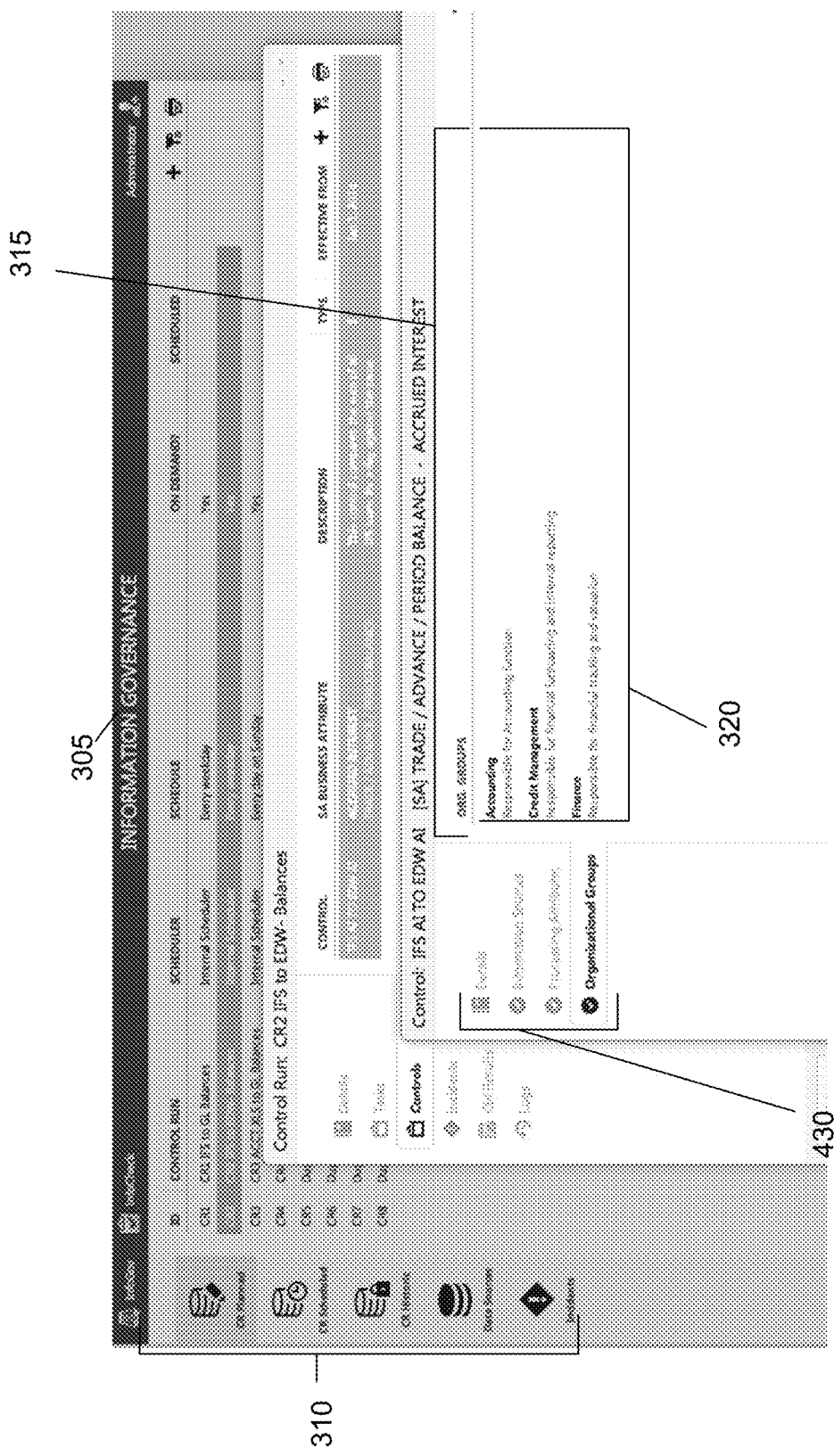
FIG. 28 illustrates an embodiment of a user interface for displaying a mapping to an organizational group.

FIG. 27 illustrates an embodiment of a user interface for showing process attributes. For example, data objects may be control objects or processing objects. Processing objects may be further defined for uniqueness or content that will be returned in the context of a control exception report. FIG. 28 illustrates an embodiment of a user interface for displaying a mapping to an organizational group. By maintaining a relationship between information sources and organization groups, the platform may enable users to know whether or not their data is accurate.

From stage 1715, where platform 100 receives control run definitions, method 1700 may proceed to stage 1720, where control runs may be initiated. Control runs may be initiated, for example, at a specified execution time or in the event of a trigger (e.g. change in data or manual selection of a control execution). Initiation specifications may be received by one or more users with access to control run triggers. The example control runs may be automatically scheduled to execute but could also be performed if triggered by an on-demand run. The retrieved data may be designated as an official copy ("system of record") or an alternate partitioning point.

From stage 1720, where control runs are initiated, method 1700 may proceed to stage 1725, where control runs may be executed. Using the mapped metadata framework, a control may retrieve data objects from one or more sources. For example, the Governance Distribution Engine 104 may obtain the content of the Reconciliation Control Dashboard 105, the Control Reports 106 and the Governance Distribution Map 114 for the reconciliation control run. The Reconciliation Control Engine 103 may pass the results of a reconciliation control run to the Reconciliation Distribution Engine 104. The Reconciliation Distribution Engine 104 may distribute the results of a reconciliation control run to the stakeholders as defined in the Information Governance Metadata Data Model 109.

Figure 29:
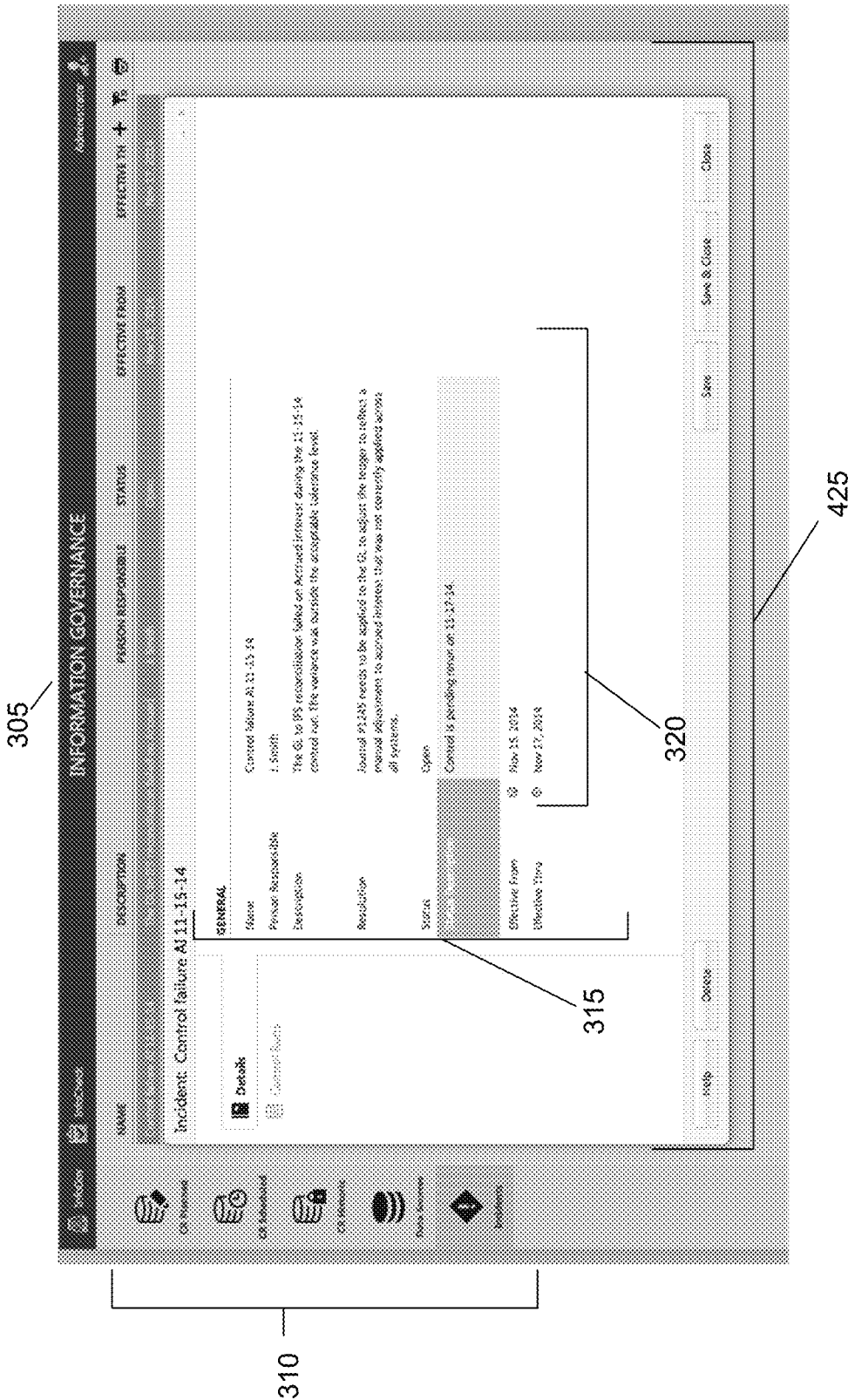
FIG. 29 illustrates an embodiment of details of a control failure incident.
Figure 30:
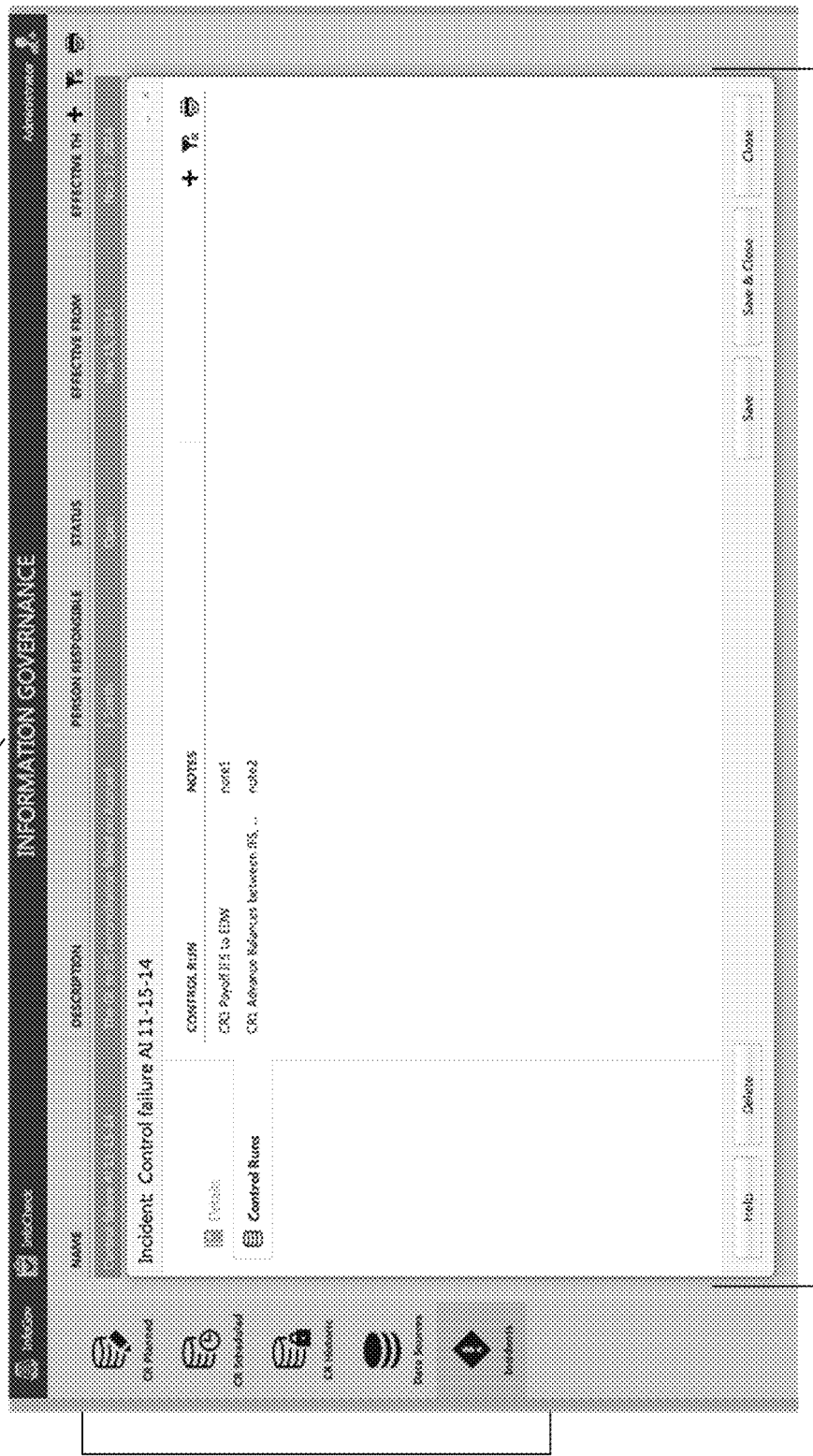
FIG. 30 illustrates an embodiment of the control runs involved in the control failure.

Once the data is retrieved, the control may then compare the retrieved data. If the data is within the pre-defined bounds (e.g. percent error or absolute error), the data may be recorded as accurate. Alternatively, if the data is outside of the pre-defined bounds, the data may register as inconsistent. An inconsistency between data may be referred to as an "incident." FIG. 29 illustrates an embodiment of details of a control failure incident. FIG. 30 illustrates an embodiment of the control runs involved in the control failure. Incidents may be assigned to multiple control runs. By assigning incidents to multiple control runs, platform 100 may enable users to track issues with multiple subject areas, business attributes, data sources, etc.

Figure 31:
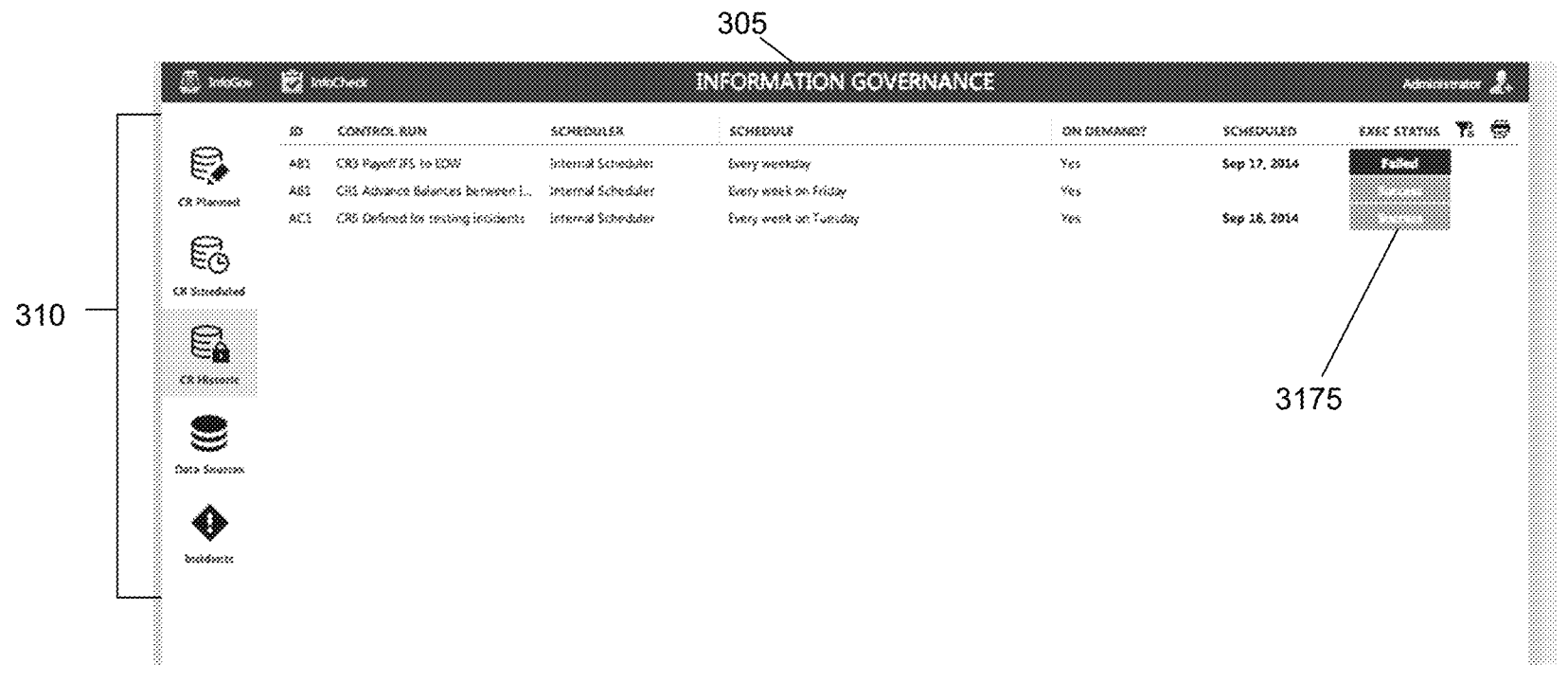
Figure 32:
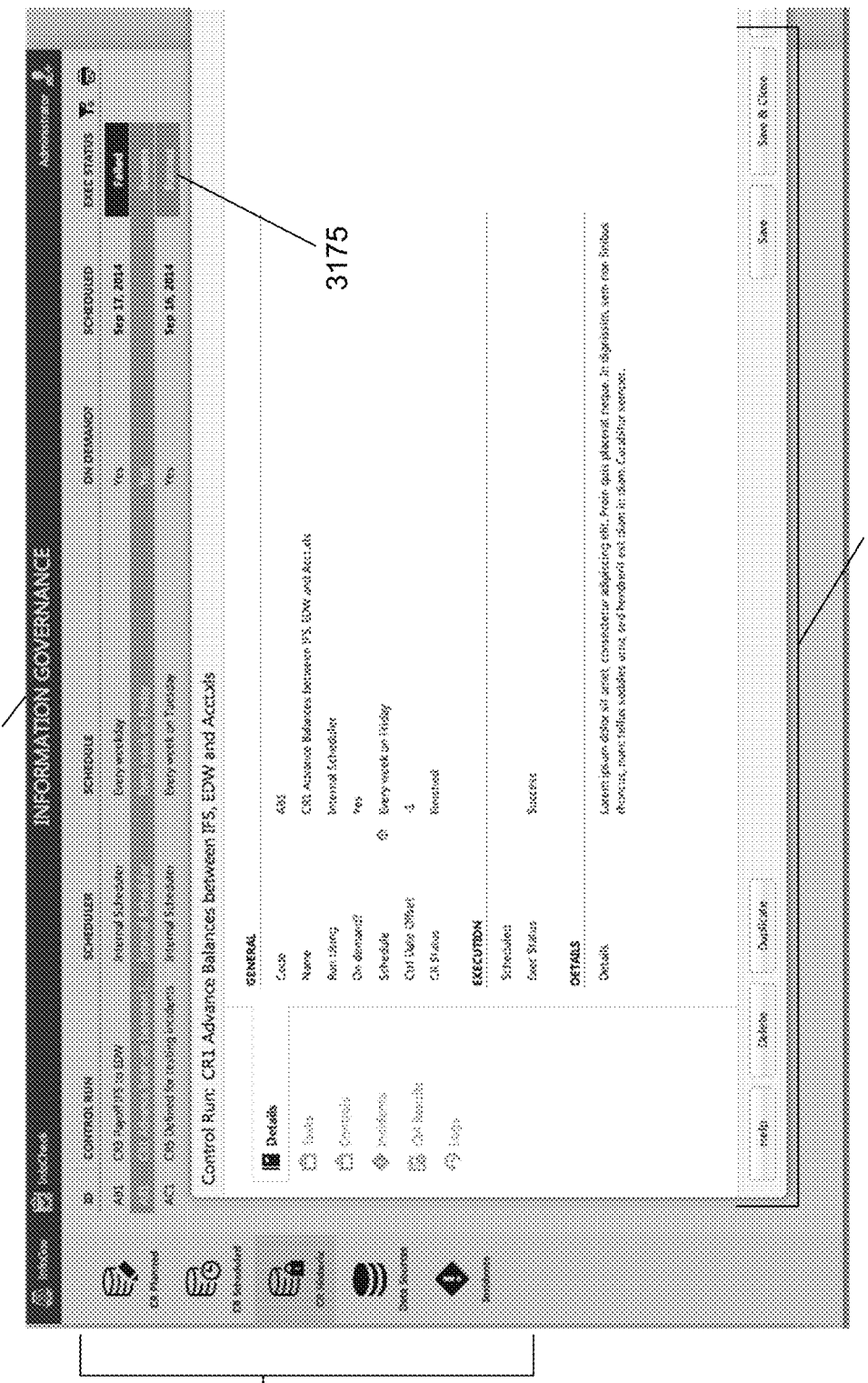
FIG. 32 illustrates an embodiment of a user interface that display detailed results of a passing control run.
Figure 33:
FIG. 33 illustrates an embodiment of a user interface for displaying details for a failed control run.

From stage 1725, where control runs are executed, method 1700 may proceed to stage 1730, where control runs may be stored. FIGS. 31-33 illustrate embodiments of user interfaces that display results of completed control runs. The results may be provided on various dashboards.

In stage 1735, method 200 may proceed to generate a governance distribution map. As illustrated in FIG. 1, Governance Distribution Map 114 may comprise information governance content about what organizational units are stakeholders for a particular reconciliation control run used to target the distribution of the results of the reconciliation control run.

The Reconciliation Control Engine 103 may work in conjunction with the components of the Cloud Infrastructure 108 to determine the Governance Distribution Map 114 based on the business rules stored in the Information Governance Metadata Data Model 109. The Governance Distribution Map 114 may be a key component of the platform.

The Governance Distribution Map may provide the specific distribution requirements for the Control Report 106 based on the Information Governance stakeholders, including, but not limited to data owners, data stewards, data consumers, and data custodians.

Having generated the governance distribution map, method 1700 may proceed to stage 1740 where governance stakeholders may be notified. Upon execution of a reconciliation control run, the Client Staff, and other designated stakeholders, may receive the results of the reconciliation control runs as depicted within the Governance Distribution Map 114.

Software code running in a Client-based Virtual Infrastructure 111 may distribute information about the status of a reconciliation control run. Results of a reconciliation control run along with information about the roles associated with the governance of the subject area, along with information about persons that are members of that role including their contact email or cell phone information, may be passed via the Connectivity between client and IGT Cloud Services 110 from the Cloud Infrastructure 108 to the Client-based Virtual Infrastructure 111. This data and process may constitute the Governance Distribution Map 114. The information may then be distributed to client staff based on the parameters in the Governance Distribution Map 114. The Governance Distribution Map 114 may enable the self-awareness of result distribution requirements to effective communicate to all stakeholders for any reconciliation control run results. The Governance Distribution Map 114 may be a dynamic component of the platform and may be programmatically derived based on the contents of the Information Governance Metadata Data Model 109.

Figure 34:
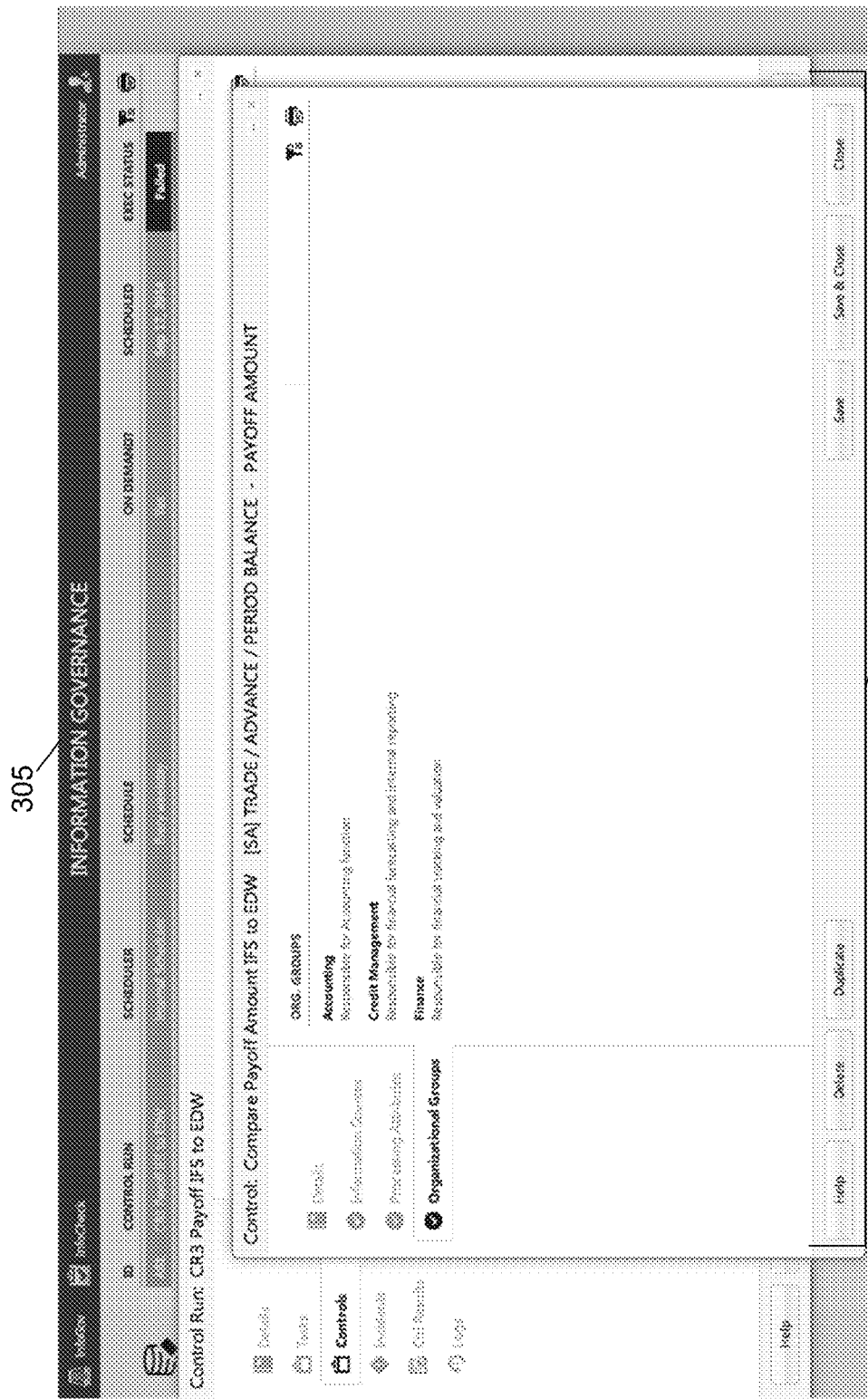
FIG. 34 illustrates an embodiment of a user interface that displays organization groups that have an interest in data associated with a control run.

In addition, users with an interest in data associated with incidents may be notified. Status indicator 3175 shows whether or not a control run found that the data was accurate, within the tolerance, or out of tolerance. FIG. 34 illustrates an embodiment of a user interface that displays organization groups that have an interest in data associated with a control run. Platform 100 may notify such organization groups that an error has occurred. Organization groups may be notified, for example, by receiving an email.

Finally, method 1745 may proceed to record the governance incident. The Client Staff may maintain the disposition of addressing any control object variance through the Incident Management Forms 107. The Governance Distribution Engine 104 may use the Governance Distribution Map 114 to distribute updates to the Incident Management Forms 107 to the Information Governance stakeholders.

IV. PLATFORM INFRASTRUCTURE

Platform 100 may be embodied as, for example, but not be limited to, a website, a web application, a desktop application, and a mobile application compatible with a computing device. The computing device may comprise, but not be limited to, a desktop computer, laptop, a tablet, or mobile telecommunications device. Moreover, platform 100 may be hosted on a centralized server, such as, for example, a cloud computing service. Although methods 200 and 1700 have been described to be performed by the platform, it should be understood that, in some embodiments, different operations may be performed by different networked elements in operative communication with computing device 3500.

Embodiments of the present disclosure may comprise a system having a memory storage and a processing unit. The processing unit coupled to the memory storage, wherein the processing unit is configured to perform the stages of methods 200 and 1700.

Figure 35:
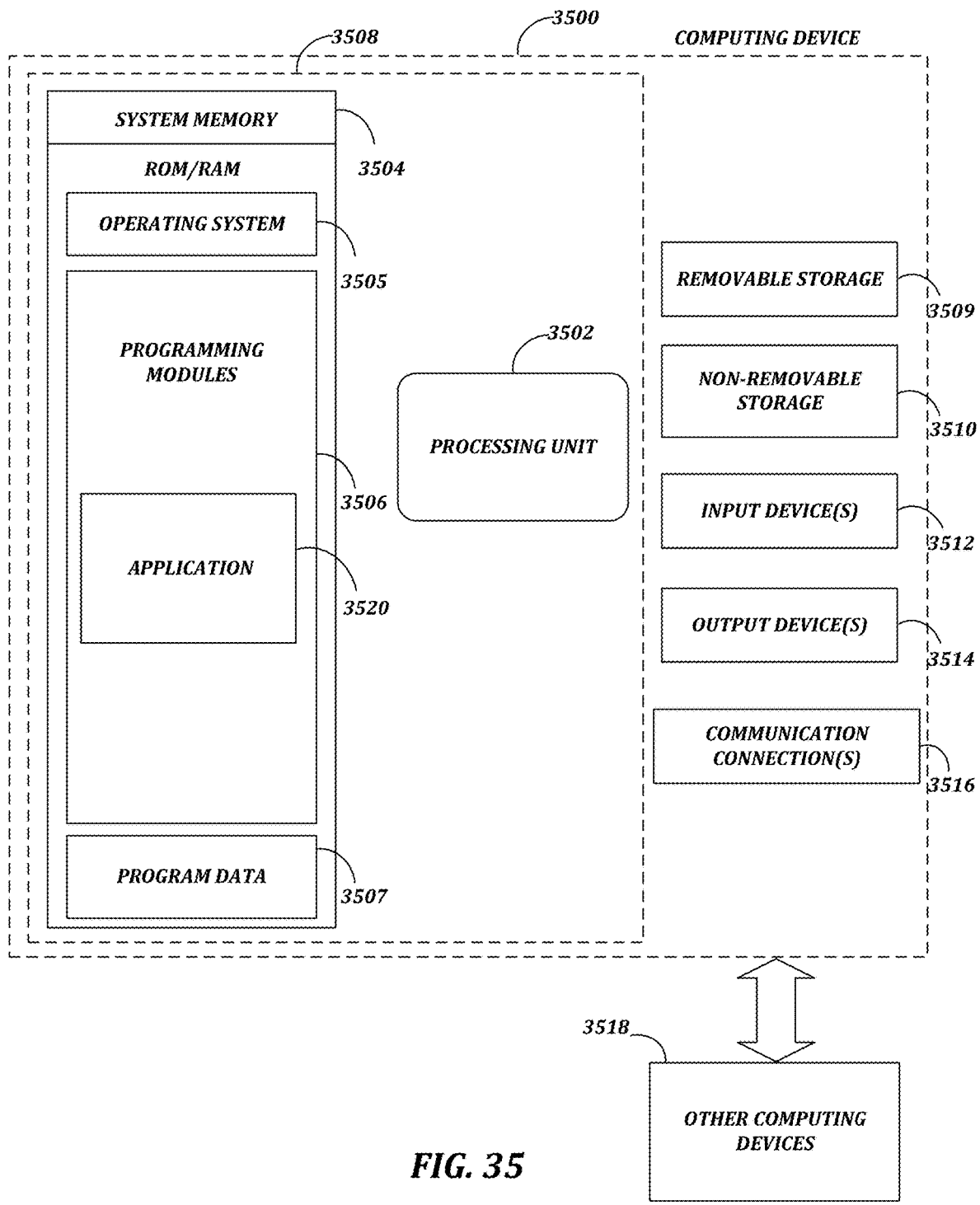
FIG. 35 is a block diagram of a system including a computing device for providing the platform.

FIG. 35 is a block diagram of a system including computing device 3500. Consistent with an embodiment of the disclosure, the aforementioned memory storage and processing unit may be implemented in a computing device, such as computing device 3500 of FIG. 35. Any suitable combination of hardware, software, or firmware may be used to implement the memory storage and processing unit. For example, the memory storage and processing unit may be implemented with computing device 3500 or any of other computing devices 3518, in combination with computing device 3500. The aforementioned system, device, and processors are examples and other systems, devices, and processors may comprise the aforementioned memory storage and processing unit, consistent with embodiments of the disclosure.

With reference to FIG. 35, a system consistent with an embodiment of the disclosure may include a computing device, such as computing device 3500. In a basic configuration, computing device 3500 may include at least one processing unit 3502 and a system memory 3504. Depending on the configuration and type of computing device, system memory 3504 may comprise, but is not limited to, volatile (e.g. random access memory (RAM)), non-volatile (e.g. read-only memory (ROM)), flash memory, or any combination. System memory 3504 may include operating system 3505, one or more programming modules 3506, and may include a program data 3507. Operating system 3505, for example, may be suitable for controlling computing device 3500's operation. In one embodiment, programming modules 3506 may include information governance application 3520. Furthermore, embodiments of the disclosure may be practiced in conjunction with a graphics library, other operating systems, or any other application program and is not limited to any particular application or system. This basic configuration is illustrated in FIG. 35 by those components within a dashed line 3508.

Computing device 3500 may have additional features or functionality. For example, computing device 3500 may also include additional data storage devices (removable and/or non-removable) such as, for example, magnetic disks, optical disks, or tape. Such additional storage is illustrated in FIG. 35 by a removable storage 3509 and a non-removable storage 3510. Computer storage media may include volatile and nonvolatile, removable and non-removable media implemented in any method or technology for storage of information, such as computer readable instructions, data structures, program modules, or other data. System memory 3504, removable storage 3509, and non-removable storage 3510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 3500. Any such computer storage media may be part of device 3500. Computing device 3500 may also have input device(s) 3512 such as a keyboard, a mouse, a pen, a sound input device, a touch input device, etc. Output device(s) 3514 such as a display, speakers, a printer, etc. may also be included. The aforementioned devices are examples and others may be used.

Computing device 3500 may also contain a communication connection 3516 that may allow device 3500 to communicate with other computing devices 3518, such as over a network in a distributed computing environment, for example, an intranet or the Internet. Communication connection 3516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 3504, including operating system 3505. While executing on processing unit 3502, programming modules 3506 (e.g., application 3520) may perform processes including, for example, one or more of method 200's and 1700's stages as described above. The aforementioned process is an example, and processing unit 3502 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Applicant. The Applicant retains and reserves all rights in the code included herein, and grants permission to reproduce the material only in connection with reproduction of the granted patent and for no other purpose.

V. CLAIMS

While the specification includes examples, the disclosure's scope is indicated by the following claims. Further- The following is claimed:

1. A method, comprising:
   receiving a plurality of subject areas of information accessed by an organization, wherein the plurality of subject areas is associated with data sources within the organization;
   receiving a specification of users associated with the plurality of subject areas of information, and the organization, wherein the specification comprises governance rules for the users associated with the plurality of subject areas of information, and the organization;
   building a metadata map representing, at least in part, a flow of information within the organization, wherein the metadata map comprises:
      the plurality of subject areas, wherein each subject area is associated with at least one user and at least one data source, and
      a plurality of attributes associated with each subject area,
         wherein at least one of the plurality of attributes is employed to determine a control object, wherein the control object is configured to serve as a test point for determining whether data is consistent across the data sources associated with the plurality of subject areas, and wherein the control object comprises a data point that is employed across more than one of the plurality of subject areas in more than one of the data sources, such that a variance in the data point from one subject area to another subject area of the plurality of subject areas implicates a health of the data across the subject areas in the organization;
   determining a plurality of control objects, the plurality of control objects being configured to serve as test points for assessing a consistency of the data across the data sources in the organization;
   performing a control run, wherein performing the control run comprises:
      accessing each of the plurality of control objects;
      assessing data associated with the plurality of control objects; and
      determining if variances in the data exist;
   after performing the control run, dynamically generating, based at least, in part, on the metadata map and results of the control run, a distribution map, wherein the distribution map includes information about one or more users, of the users, that are stakeholders for the control run as defined in the metadata map, and wherein the distribution map is used for user notifications by targeting distribution of the results of the control run; and
   issuing, based on the distribution map, a notification to at least one user associated with each control object in which data variances were detected, wherein the at least one user is specified in a governance role associated with the subject areas corresponding to the control objects, and wherein the at least one user is specified as a stakeholder in the distribution map.

2. The method of claim 1, wherein receiving the specification comprising the governance roles for the users associated with the subject areas of information, and the organization comprises receiving a specification of stakeholders associated with the data.

3. The method of claim 2, wherein receiving the specification of the stakeholders associated with the data comprises receiving a specification of at least one of the following:
   a data owner,
   a data steward,
   all registered data consumers, and
   a data custodian.

4. The method of claim 3, further comprising receiving a specification of business rules for a declared governance role, of each stakeholder, with the data.

5. The method of claim 4, wherein determining the plurality of control objects comprises receiving a specification of at least one of the following:
   data infrastructure configured to serve as the test points for assessing the consistency of the flow of information across the metadata map, and
   a stakeholder to receive notifications in association with a current state of the data infrastructure.

6. A method, comprising:
   receiving a plurality of information sources employed by an organization;
   classifying data associated with the plurality of information sources, wherein classifying the data associated with the plurality of information sources comprises:
      categorizing the data; and
      assigning a subject matter for the data;
      receiving a specification of a control object, the specification comprising:
         data infrastructure configured to serve as test points for assessing a consistency of a flow of information within the organization,
         wherein the control object is configured to serve as a test point for determining whether the data is consistent across the plurality of information sources, wherein the control object comprises a data point that is employed across more than one of the information sources, such that a variance in the data point from one information source to another information source would implicate a health of data across the organization;
   associating an attribute with the control object;
   determining a subject area associated with the attribute;
   determining a business unit associated with the subject area;
   receiving a specification of stakeholders associated with the business unit;
   receiving a specification of stakeholders associated with the classified data, wherein receiving the specification of the stakeholders comprises receiving a specification of at least one of the following:
      a data owner,
      a data steward,
      all registered data consumers, and
      a data custodian;
   receiving a specification of business rules for access requirements, of each stakeholder, associated with the attribute;

building a metadata map representing, at least in part, association of each stakeholder with the classified data, and a flow of data within the organization, wherein the metadata map comprises:
  classes of data, wherein each class of data is associated with at least one stakeholder and at least one information source, and
  a plurality of attributes associated with each class of data, wherein at least one of the plurality of attributes comprises information associated with a location of data corresponding to the control object;
performing a control run, wherein performing the control run comprises:
  accessing the data infrastructure associated with a plurality of control objects;
  assessing data within the data infrastructure; and
  determining if variances in the data exist;
after performing the control run, dynamically generating, based at least, in part, on the metadata map and results of the control run, a distribution map, wherein the distribution map includes information about stakeholders for the control run as defined in the metadata map, and wherein the distribution map is used for user notifications by targeting distribution of the results of the control run; and
issuing, based on the distribution map, a notification to a stakeholder associated with each control object in which data variances were detected.

7. The method of claim 6, further comprising generating at least one report, the at least one report being based on at least one of the following: a size and a number of variances identified during reconciliation control runs, an amount of history to be retained, and a user security authorization and permissions to manage an incident.

8. The method of claim 7, further comprising providing at least one dashboard comprising the at least one report.

9. The method of claim 6, wherein receiving the specification of the control object further comprises receiving a specification of at least one of the following: tolerances associated with data variances in data infrastructure key control measures, system of record, known copies, reconciliation tolerance requirements, business rules required for reconciliation controls to aggregate the control objects, and a relationship between system of record control objects, and known copies of the control objects.

10. The method of claim 6, further comprising providing a dashboard that includes a status indicator that indicates whether the control run found that the data was accurate, within a tolerance, or out of tolerance.

11. The method of claim 6, further comprising providing a dashboard that displays the most recent reconciliation control runs based on subject areas, a governance assigned to the subject area, a role associated with the governance assignment, and a user associated with the role, resulting in a display of all reconciliation control runs that the user has a governance relationship to.

12. A non-transitory computer-readable medium comprising a set of instructions, which when executed, perform a method, the method, executed by the set of instructions, comprising:
  receiving a plurality of information sources employed by an organization;
  classifying data associated with the plurality of information sources, wherein classifying the data associated with the plurality of information sources comprises:
    categorizing the data; and
    assigning a subject matter for the data;
  receiving a specification of a control object;
  associating an attribute with the control object;
  determining a subject area associated with the attribute;
  determining a business unit associated with the subject area;
  receiving a specification of stakeholders associated with the business unit;
  receiving a specification of business rules for access requirements, of each stakeholder, associated with the attribute;
  building a metadata map representing, at least in part, association of each stakeholder with the classified data, and a flow of information within the organization, wherein the metadata map comprises:
    the plurality of information sources, wherein each information source is associated with at least one stakeholder, and
    a plurality of attributes associated with each class of data, wherein at least one of the plurality of attributes comprises information associated with a physical location of data corresponding to the control object;
  determining a plurality of control objects, wherein determining the plurality of control objects comprises receiving a specification of:
    data infrastructure configured to serve as test points for assessing the consistency of the flow of information across the metadata map,
    a stakeholder associated with the data infrastructure, and
    tolerances associated with data variances in the data infrastructure,
    wherein the plurality of control objects, in conjunction with the tolerances, are configured to serve as a test point for determining whether the data is consistent across the information sources, wherein the plurality of control objects comprise a data point that is employed across more than one of the information sources, such that a variance in the data point from one information source to another information source, in excess of a tolerance, would implicate a health of data across the organization;
  performing a control run, wherein performing the control run comprises:
    accessing the data infrastructure associated with each of the plurality of control objects;
    assessing data within the data infrastructure; and
    determining if variances in the data exist in excess of the tolerance;
  after performing the control run, dynamically generating, based at least, in part, on the metadata map and results of the control run, a distribution map, wherein the distribution map includes information about stakeholders for the control run as defined in the metadata map, and wherein the distribution map is used for user notifications by targeting distribution of the results of the control run; and
  issuing, based on the distribution map, a notification to a stakeholder associated with each control object in which data variances in excess of the tolerance were detected.

13. The non-transitory computer-readable medium of claim 12, further comprising generating at least one report, the at least one report being based on at least one of the following: a size and a number of variances identified during reconciliation control runs, an amount of history to be retained, and a user security authorization and permissions to manage an incident.

14. The non-transitory computer-readable medium of claim 13, further comprising providing at least one dashboard comprising the at least one report.

15. The non-transitory computer-readable medium of claim 12, wherein determining the plurality of control objects further comprises receiving a specification of at least one of the following: tolerances associated with data variances in data infrastructure key control measures, system of record, known copies, reconciliation tolerance requirements, business rules required for reconciliation controls to aggregate the control objects, and a relationship between system of record control objects, and known copies of the control objects.

\* \* \* \* \*